US012625085B2

(12) United States Patent
Sturzebecher et al.

(10) Patent No.: US 12,625,085 B2
(45) Date of Patent: May 12, 2026

(54) ANALYSIS DEVICE FOR CONDITION MONITORING OF A PROTECTIVE GLASS OF A MANUFACTURING FACILITY AND A MANUFACTURING FACILITY FOR AN ADDITIVE MANUFACTURING PROCESS

(71) Applicant: DMG MORI ADDITIVE GMBH, Bielefeld (DE)

(72) Inventors: Hermann Sturzebecher, Osnabrück (DE); Christian Tenbrock, Rheda-Wiedenbrück (DE)

(73) Assignee: DMG MORI ADDITIVE GMBH, Bielefeld (DE)

( * ) Notice: Subject to any disclaimer, the term of this patent is extended or adjusted under 35 U.S.C. 154(b) by 175 days.

(21) Appl. No.: 18/580,658

(22) PCT Filed: Nov. 28, 2022

(86) PCT No.: PCT/EP2022/083439
§ 371 (c)(1),
(2) Date: Jan. 19, 2024

(87) PCT Pub. No.: WO2023/222251
PCT Pub. Date: Nov. 23, 2023

(65) Prior Publication Data
US 2025/0085236 A1      Mar. 13, 2025

(30) Foreign Application Priority Data
May 18, 2022      (DE) ..................... 10 2022 112 524.6

(51) Int. Cl.
*G01N 21/95*      (2006.01)
*B29C 64/25*      (2017.01)
(Continued)

(52) U.S. Cl.
CPC ........... *G01N 21/958* (2013.01); *B29C 64/25* (2017.08); *B29C 64/264* (2017.08); *B33Y 30/00* (2014.12)

(58) Field of Classification Search
CPC ...... G01N 21/88; G01N 21/958; B29C 64/25; B29C 64/264; B33Y 30/00
See application file for complete search history.

(56)      References Cited

U.S. PATENT DOCUMENTS

2022/0111599 A1* 4/2022 Mamrak ............... B29C 64/153

FOREIGN PATENT DOCUMENTS

DE      196 05 018 A1      8/1997
DE      198 39 930 C1      9/1999
(Continued)

OTHER PUBLICATIONS

Feb. 7, 2023 Office Action issued in German Patent Application No. 10 2022 112 524.6.
(Continued)

*Primary Examiner* — Kevin K Pyo
(74) *Attorney, Agent, or Firm* — Oliff PLC

(57)      ABSTRACT

An automatable manufacturing facility being based on optical interactions, in particular a manufacturing facility for Selective Laser Melting processes ("Selective Laser Melting", SLM), and an integrable analysis device which, by optical detection and analysis of an object plane allocated in the manufacturing facility, is configured to determine the state of deterioration, ageing and/or contamination of one or more protective glasses integrated in the manufacturing facility. In addition, a manufacturing system for automatic manufacturing of a workpiece based on optical raw material irradiation, wherein the manufacturing system is, by means of signal exchange between the manufacturing system and the integrated analysis device, capable of assessing the state
(Continued)

and/or remaining lifespan of a corresponding protective glass.

13 Claims, 9 Drawing Sheets

(51) Int. Cl.
    *B29C 64/264*         (2017.01)
    *G01N 21/958*       (2006.01)
    *B33Y 30/00*        (2015.01)

(56)            References Cited

FOREIGN PATENT DOCUMENTS

| DE | 101 13 518 A1 | 10/2002 |
|----|---------------|---------|
| DE | 698 37 379 T2 | 12/2007 |
| DE | 10 2007 003 023 B4 | 5/2009 |
| DE | 10 2012 102 785 B3 | 2/2013 |
| DE | 10 2014 203 798 A1 | 9/2015 |
| DE | 202017000356 U1 * | 2/2017 | ............ G01N 21/94 |
| DE | 10 2016 123 000 B3 | 12/2017 |
| DE | 10 2018 102 828 A1 | 8/2019 |
| DE | 10 2018 210260 A1 | 12/2019 |
| DE | 10 2019 005 731 A1 | 2/2021 |
| EP | 1 354 664 A1 | 10/2003 |
| EP | 1 398 612 A1 | 3/2004 |
| JP | H10-249566 A | 9/1998 |
| JP | 2013-052440 A | 3/2013 |
| WO | 2017/178049 A1 | 10/2017 |
| WO | WO-2022050436 A1 * | 3/2022 | ......... B23K 26/0648 |

OTHER PUBLICATIONS

Mar. 24, 2023 International Search Report issued in International Patent Application No. PCT/EP2022/083439.

Mar. 24, 2023 Written Opinion of the International Searching Authority issued in International Patent Application No. PCT/EP2022/083439.

Nov. 27, 2024 Office Action issued in German Patent Application No. 10 2022 112 524.6.

* cited by examiner

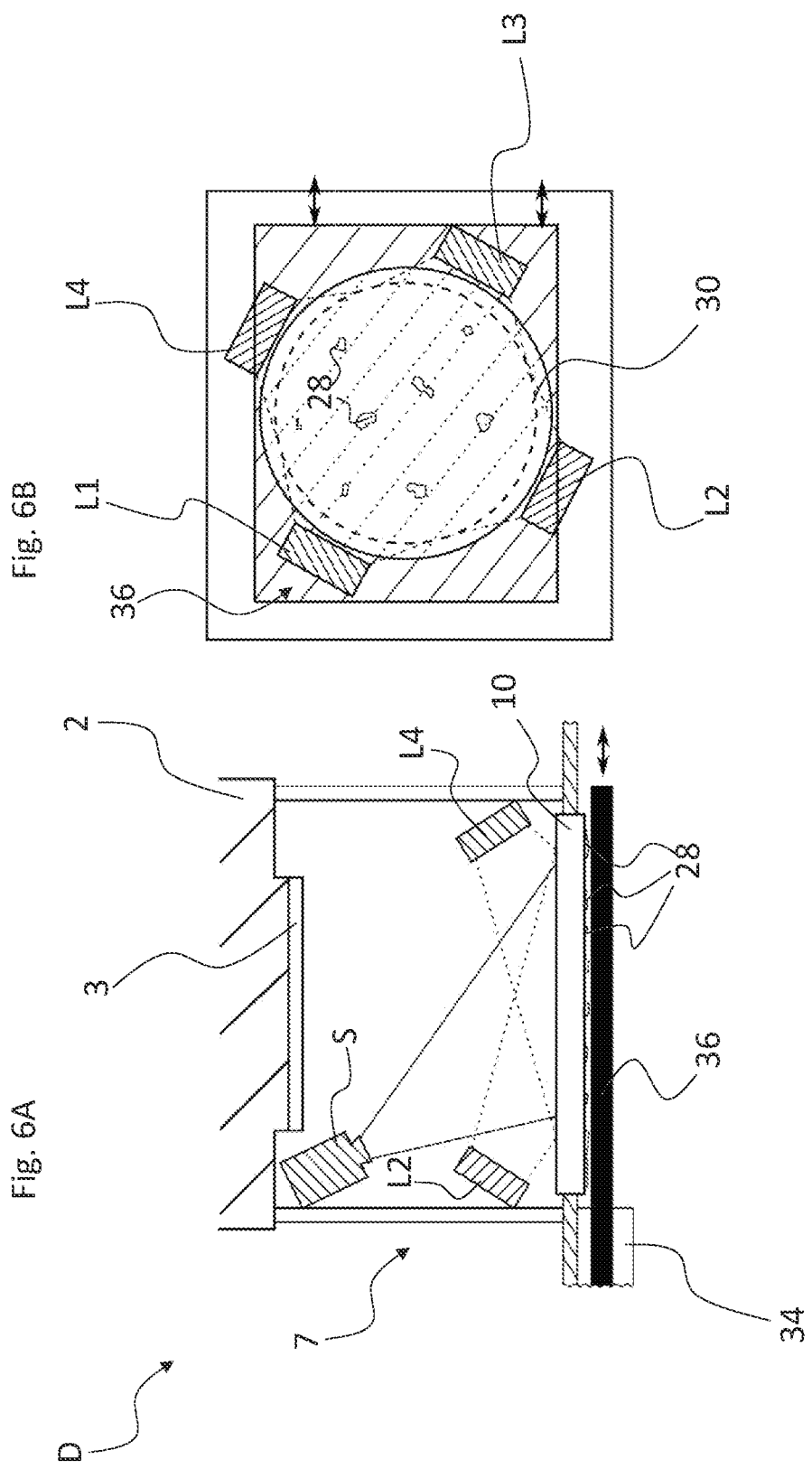

ANALYSIS DEVICE FOR CONDITION MONITORING OF A PROTECTIVE GLASS OF A MANUFACTURING FACILITY AND A MANUFACTURING FACILITY FOR AN ADDITIVE MANUFACTURING PROCESS

The present invention relates to an automatable manufacturing facility being based on optical interactions, in particular a manufacturing facility for Selective Laser Melting processes ("Selective Laser Melting", SLM), and an integrable analysis device which, by optical detection and analysis of an object plane allocated in the manufacturing facility, is configured to determine the state of deterioration, ageing and/or contamination of one or more protective glasses integrated in the manufacturing facility. In addition, the present invention relates to a manufacturing system for automatic manufacturing of a workpiece based on optical raw material irradiation, wherein the manufacturing system is, by means of signal exchange between the manufacturing system and the integrated analysis device, capable of assessing the state and/or remaining lifespan of a corresponding protective glass.

BACKGROUND OF THE INVENTION

Due to the raising complexity of current work processes and the resulting requirement of manufacturing facilities to produce as precise, automatic and extensive as possible, manufacturing and processing of workpieces on the basis of optical interaction processes have been established.

Herein, state of the art manufacturing facilities that are based on optical interactions, e.g. laser-induced manufacturing facilities and/or facilities being based on additive production steps, for example, Selective Laser Melting, normally comprise one or more high-intensity light sources that are coupled with a multitude of fine-tuned and automatic controllable optical elements (lenses, mirrors, filters etc.) and thus enable the manufacturing facility, by means of generating a condensed and focused ray of light aimed at a given production point, to plastically deform a given work piece or a corresponding raw material. As an example, a manufacturing facility using a Selective Laser Melting procedure may comprise at least a laser light source which, by means of software-supported optics, is configured to focus a bundled laser light beam on powdery layers of raw materials to be processed and thus generate an extremely effective, three-dimensional production process capable of creating local layer-by-layer based fusions within the above-mentioned material.

Despite continuous further development of such production systems, however, the problem still arises in most such systems that the components required for forwarding the aforementioned optical processing beam can become contaminated or even damaged due to contamination or processing residues arising during the manufacturing process, resulting in a reduction in the illumination precision and consequently in a reduction in the quality of the generated workpiece. On that basis, in order to protect such components, said production systems normally comprise at least an additional (e.g. translucent) protective glass, which is generally positioned between the light-guiding optics or the respective light source and an operating position used to produce a respective workpiece and thus also inevitably is coming into contact with the aforementioned process emissions. Herein, contamination or damage to the protective glass yet likewise introduces a variety of problems: On the one hand, clouding of the protective glass may occur which may adversely affect the aforementioned manufacturing light path so that, for example, the intensity of the processed light beam may decrease. In addition, it is also possible that individual light scattering events occurring at contamination or damage areas may lead to a shift in the beam profile, so that not only quality fluctuations within the production line may become apparent, but also the energy of the light source deflected or absorbed in this way may generate further damage (e.g. melting, fractures or cracks) to the protective glass. Accordingly, it is critical for manufacturing facilities that are based on optical interactions to develop an accurate analysis mechanism for identifying any abnormal conditions, such as contamination and damage conditions, that is both capable of providing an assessment of the level of contamination or deterioration of a protective glass implemented in the manufacturing facility, as well as integrating such assessment possibilities as non-invasively and efficiently as possible into the latter.

Herein, as an example, the content of DE 102014203798 relates to a method for monitoring the state of contamination and/or damage on a protective glass of a laser processing head attached to a robot in which the robot is configured to move said laser processing head into the field of view of a stationary placed camera device.

However, respectively common methods and devices have the problem that, due to the merely passive measurement techniques (normally, the respective methods measure the effects emanating from a contamination, but not the contamination itself), no direct prediction about the degree of contamination of a protective glass can be made, but only of the glasses corresponding optical properties, which are equally influenced by other sources (e.g. bending, aging processes) of the glasses material. Furthermore, known devices are neither able to locally identify contamination accumulations on a given protective glass (since the measured scattered light can, potentially, come from any area of the exposed area), nor are they normally built integrable into existing manufacturing facilities since scattered light measurements are generally requiring specifically designed system geometries to allow for consistent and precise outputs.

One aim of the present invention is to provide an optimized manufacturing facility for additive manufacturing processing with which improved production qualities can be achieved. In addition, it is an aim of the present invention to provide an integrable analysis device with which the status of the manufacturing facility can be efficiently monitored and to provide a manufacturing process for optimized production of workpieces by means of additive manufacturing. Moreover, it is an additional aim of the present invention to eliminate the aforementioned problems of the prior art and, in particular, to provide an analysis device for detecting states, in particular contamination, deterioration and/or aging states, on one or more protective glasses of a manufacturing facility that is based on optical interactions which can detect even local changes of the glasses state, such as individual contamination and/or damage structures, and thus make the evaluation of contamination, deterioration or aging levels even more precise and effective. In addition, it is an aim of the present invention to provide an analysis device which can be easily integrated into the process flow of existing manufacturing facilities and which can both, use the additional information obtained by the above-mentioned state localization for determinations of predefined evaluation parameters as well as for monitoring and forecasting of possible cleaning and/or replacement times of a respective protective glass.

DETAILED DESCRIPTION OF THE INVENTION

To solve the above problem, the features of the independent claims are proposed. The dependent claims relate to preferred embodiments of the present invention.

The analysis device of the present invention may herein preferably comprise at least one optical sensor device for detecting an object plane associated with a protective glass or protective glasses of the manufacturing facility (i.e., which may directly located on the protective glass) as well as an illumination device for illuminating the respective object plane preferably detected by the sensor device, wherein the optical sensor device and the illumination device may preferably be configured to detect existing protective glass conditions by means of the illumination device, in particular by illuminating structures occurring on the protective glass, such as contamination, deterioration or aging structures (e.g. contamination: process by-products, such as smudge particles, meltings, but also residues of improper cleaning, such as streaks, fibers and/or (dust) particles; deteriorations: scratches, chippings, burns or damaged coatings and signs of aging such as fadings within the protective glass), and subsequently locating said structures with the aid of the optical sensor device.

Consequently, the present analysis device may preferably form at least a two-part device system which, with the aid of the first device (the optical sensor device), is capable of directly and spatially identifying abnormal conditions, such as impurities and deteriorations, present on one or more protective glasses, whereas the second device (the illumination device) may ensure a precise and uniform illumination of the aforementioned structures, adjusted to the requirements of the optical sensor device. Consequently, the present invention makes it possible to provide an analysis device which is able to determine the condition of one or more protective glasses not by mere optical (and thus influenceable) secondary effects, but in particular by the direct identification of individual objects and/or anomalies found on the protective glass, thus realizing a more precise and error-immune detection mechanism.

Further, possible alternative embodiments of the present invention may also include, in particular, further simplifications of the above-mentioned analysis device. For example, it may be equally possible that, in addition to or instead of the aforementioned illumination device, also an external illumination source, for example a light source integrated within the assembly space of the corresponding manufacturing facility, may be used to detect anomalies of said protective glass, thereby providing an even more compact and easier integrable analysis device. Conversely, in a different yet equally preferred embodiment, the analysis device may also be designed at least in such a way that, for example, it only comprises the above-mentioned sensor device (i.e. not including an illumination device) while still being able to analyze the state of the respective protective glass on the basis of external illumination or, otherwise, solely by the sensor device itself.

The optical sensor device may further preferably comprise at least one optical sensor element, such as a photodiode, a CCD sensor, a CMOS sensor, or a sensor system connected to an optical sensor, which, in order to detect the above-mentioned object plane, may be coupled to correspondingly controllable optics, such as focus or scatter lenses, mirrors or optical filters and thus be able to focus, depending on the optical properties of the above-mentioned elements, on at least an arbitrary, three-dimensional point within the respective production system. Accordingly, in a preferred case, the detection of the previously described object plane may also be understood at least as a signal detection process in which a signal emanating from the focal plane of the optical sensor device may be fed to the respective sensor element (image plane) and thus may be prepared and evaluated for subsequent process steps.

Based on these properties, the optical sensor device may accordingly be configured to generate at least an one-dimensional mapping of the respectively detected object plane based on the above-mentioned signals. In a specifically preferred case, the optical sensor element of the optical sensor device may in particular yet also be designed as an imaging sensor, for example by implementing a single- or multi-pixel sensor and/or a coupled and scannable lens system, so that each point of the object plane detected by the optical sensor device may be identified as an element of a spatially resolved, at least one-dimensional, yet, in particularly preferred cases, primarily two-dimensional image. As a consequence, by means of the optical sensor device it may be equally possible to, depending on the selected orientation of the implemented optics, focus on a preferably arbitrary plane (object plane) connected to one or more protective glasses and thus to reproduce said object plane as a one- or two-dimensional, signal-dependent and spatially resolved image within the present invention Further, in order to ensure an accurate identification of existing structures, such as the above-mentioned contaminations, deteriorations and/or ageing structures found on a corresponding protective glass, the aforementioned object plane detected by the sensor device may be also preferably positioned in parallel to and, in an even more preferred case, at the same (height) level of the contaminated optical surface (in particular, at an outer surface of the protective glass facing the manufacturing area), which may lead to an optimized imaging sharpness with regard to the aforementioned particle identification. Alternatively, however, it may also be possible to define several object planes, for example at different heights or in different cross-sectional axes of the protective glass, which may then be preferably approached by automatically steering the optical elements located in the sensor device (preferably one after the other) and used for additional measurement data generation.

Accordingly, in addition to the above-stated two-dimensional images of the contamination, deterioration and/or aging structures located on a protective glass, it may be in the present invention also preferably possible to generate a three-dimensional illustration of the aforementioned elements that is based on a multitude of detected object planes, leading to the effect that also additional information, such as the shape or height of the structures accumulating on a protective glass, may be used for further analysis. Similarly, the optical sensor device may also preferably be configured, in particular in order to allow for maximum resolution within the individual detected images, to capture only individual, local areas within a given plane, so that, for example, in pixel sensor-based sensor devices, the corresponding pixel-to-image rate can be optionally increased. For this purpose, the sensor device may also preferably be equipped with further image enhancing mechanism, such as an auto-focus, dichroid filters, bandpass filters or even predefined software-based image processing means, which may automatically adjust the sharpness (and thus the informational content of the recorded images) both during and/or after the detection process and thus enable an optimal detection of the protective glasses contamination state.

The signal to be detected by the optical sensor device may further, as already mentioned above, preferably be generated by illuminating the at least one object plane by means of the illumination device equally implemented in the analysis device or by an external illumination source. In particular, in a preferred embodiment, the illumination device may preferably send a mono- or multichromatic light beam at a predefined angle of incidence onto a protective glass or onto the object plane associated with the protective glass so that, by interaction of the irradiated light with the contamination, deterioration and/or aging structures adhering to the protective glass, a corresponding signal mapping dependent on the aforementioned structures may be generated.

Thus, in a first preferred embodiment, the illumination device may further preferably be arranged in particular as an incident light source oriented with respect to the previously described sensor device. Accordingly, in this case, the illumination device may be configured to output and impinge the light generated for illuminating the at least one protective glass from the side of the protective glass facing the optical sensor device so that, in case the surface of the protective glass is completely clean or free of defects, the respective illuminating beam emanating from the illumination device may completely pass through the protective glass (i.e. essentially without a reflective interactions) and thus may not be redirected to the optical sensor device. Accordingly, based on this setup, it may be possible to efficiently localize and identify existing contamination, deterioration and/or aging structures within a given protective glass by using the scattered light generated by the respective structures as a sensor signal, since any light (naturally) emanating from the illumination device can be effectively kept away from the optical sensor device. As a consequence, a preferable detection process of the analysis device of this first embodiment may preferentially comprise the process steps of at least first creating a homogeneous illumination of the object plane to be captured by the optical sensor device (or of the corresponding at least one protective glass) while. subsequently, the contamination, deterioration and/or aging structures adhered on the protective glass may be detected by using the so emerging light scattering patterns in the system as spatially resolved signals for structure localization.

In order to even further improve the aforementioned process, the illumination device may also, beyond an illumination light source such as LEDs, a light diode system or a laser required for the protective glass illumination, comprise additional elements such as additional polarization, intensity or color filter, focus or scattering lenses or even condensers (e.g. honeycomb condensers) suitable for beam homogenization, which may be preferentially coupled to the illumination light source and controlled in an automatic or a manual manner. In addition, in a preferred embodiment, the optical elements of the optical sensor device and the illumination device of the present invention may also be configured to act in a coordinated fashion and may be directed in such way that, depending on selected settings applied to one of the respective devices (e.g. the illumination device), the elements of the other device (e.g. the optical sensor device) may be adjusted accordingly. As an example, the illumination device may be configured to change the light intensity generated by the illumination light source, for instance, depending on external parameters or adjust its spectral bandwidth by introducing additional filters present within the illumination device while the optical sensor device likewise, in response, may automatically add or remove filters or other optical elements from the optical sensor device so as to further improve analysis conditions.

Moreover, in order to even further enhance the illumination quality during the above-mentioned detection process, the illumination device may also be configured to perform the illumination of the respective object plane either continuously or in a pulse-like manner. Likewise, the illumination device may be preferably configured to efficiently adjust the respective angle of incidence of the light used for illumination at least by mechanically re-orientating the corresponding illumination device. Similarly, also several illumination light sources or optical elements coupled to the latter may be provided or, equivalent to the optical sensor device, only predefined partial areas of the detected object plane may be illuminated by the illumination device, which particularly allows for high illumination intensities.

Beyond that, further embodiments of the illumination device may preferably also comprise the use of other illumination types. For example, in a second preferred embodiment, the illumination device may, contrary to the incident light process of the above-mentioned first embodiment, also be configured to provide a transmitted light illumination process for detecting the contamination, deterioration and/or aging structures on the protective glass. For this purpose, the illumination device may, in a particularly preferred case, at least be mounted on the side of the at least one protective glass facing away from the optical sensor device (and, preferably, at a predetermined distance from the protective glass), so that, in case of an defect- or contamination-free state of the protective glass, the generated illumination beam of the illumination device may preferably both, reach the respective protective glass and shine through it in an non-reflective way as well as reach each of the sensor devices individual pixels located behind said protective glass.

Accordingly, in this embodiment it may be equally possible to detect individual contamination, deterioration and/or aging structures on one or more protective glasses, wherein in this case, individual structure localization may not be based on the scattered light emanating from each of the aforementioned elements but, vice versa, by detecting the loss of light intensity that is caused by said scattering event. Consequently, in addition to the positioning of the illumination device itself, the previously described embodiments of the illumination device may also differ, in particular, in that the contamination, deterioration and/or aging structures thereinafter captured in an image by the optical sensor device, may appear, in the first embodiment, as patterns contain higher intensity values compared to the captured images background intensity, whereas the image background detected in the second embodiment may generally show large intensity values (due to the additionally detected transmitted light) yet also significant intensity signal reduction at alleged locations of the above-stated structures. Accordingly, both of the aforementioned embodiments may realize an efficient and precise methodology for identifying the conditions of a protective glass conditions, while, at the same time, preferred mounting positions of used elements as well as different illumination types may be taken into account.

In addition, further embodiments of the above-mentioned exposure device may preferably also comprise a combination of the aforementioned types of illumination, for example by introducing light sources located in a predefined space in front of and behind the corresponding protective glass with respect to the optical sensor devices position, attaching the illumination device directly to the optical sensor device or even by omitting the illumination device and illuminating the protective glass solely by means of external illumination sources, such as an installation light present within the associated manufacturing facility. Further, in yet an additional embodiment, to be identified as a third embodiment, the illumination device may also preferably be mounted laterally to the glass surface of the corresponding protective glass (in particular, as LEDs laterally arranged on the narrow side of the respective protective glass or arranged in a ring shape), so that, compared to the previously mentioned cases, likewise a radial illumination, i.e., an illumination from the outside of a protective glass to its center, may be realized. As a consequence, the latter illumination type may particularly create the advantage of equally generating lateral illumination images of the respectively sought contamination, deterioration and/or aging structures, which may result in further advantageous effects with regard to the subsequent structure analysis.

Accordingly, it is apparent that by the detection mechanism generated by the present analysis device, an effective and at the same time precise analysis of the conditions existing on at least one protective glass can be realized. Moreover, it is to be noted that the above-mentioned simple design of the present analysis device, consisting of only one or two device elements (the optical sensor device and (optionally) the illumination device), allows a much more flexible adaptation to the respective conditions occurring within different production lines.

For example, due to the direct (and thus independent of any elements introduced into the manufacturing facility) analysis of the at least one protective glass by the sensor device, the analysis device of the present invention can also, in a preferred case, be designed as an analysis unit that can be integrated into already existing manufacturing equipment, which in particular further increases the technical value added to the present invention.

Consequently, in the present invention, it may also preferably be possible to incorporate the previously described device elements of the analysis device, in particular interference-freely, into the setup of a respective manufacturing facility that is based on optical interactions.

For this purpose, the analysis device may preferably be configured to be integrated or positioned at least along the light path created by the manufacturing light source of the manufacturing facility, so that not only the shortest possible detection distance can be established between the above-mentioned optical sensor device and the at least one protective glass, but also corresponding free spaces existing in the production system can be made usable for the integration of the respective device elements. For example, due to the optical properties and the resulting working distances of the optical manufacturing elements defining the light path, there may be recesses in manufacturing systems which are normally kept for beam manipulation purposes (focusing, scattering, widening, etc.) of the manufacturing light beam and thus may be potentially used for integrating additional devices. Accordingly, in a particularly preferred case, the analysis device of the present invention may be particularly configured to utilize said free spaces within a manufacturing facility and incorporate its existing device elements, yet at least the optical sensor device, into the aforementioned free spaces so as to enable an efficient and interference-free integration into the corresponding manufacturing process. Consequently, the above-mentioned positioning of the claimed analysis device may provide the advantage that the respective optical sensor device can not only be arranged in a particularly space-saving but also, in regard to the remaining manufacturing procedure, preferably independent manner. Further, the manufacturing process itself may be equally improved since the integration of the analysis device may provide additional protection from potential contaminations and/or damages. As a result, in a particularly preferred embodiment, the optical sensor device of the present analysis device may be also configured, for efficient integration of the analysis device into the manufacturing facility, to be positioned at least between the light source and the protective glass of the manufacturing facility, so that the free spaces existing along the light path of the manufacturing facility can be effectively utilized.

Further, in an additional preferred embodiment, the optical sensor device may be for this purpose also preferably configured to be integrated at least between the light source and the optical manufacturing elements of the manufacturing facility set up for modifying the manufacturing light beam so that, in particular, the free spaces existing between the optical manufacturing elements may be effectively used. Similarly, in this case it may also preferably be possible for the optical sensor device to be integrated into the light path of the optical manufacturing elements, for example by implementing additional mirror axes, so that likewise already existing portions of the manufacturing facility can be effectively utilized for the detection of the protective glass and/or the associated object plane by means of the sensor device.

Alternatively, in an additional preferred embodiment, the optical sensor device may yet also be configured to be arranged in particular between the aforementioned optical manufacturing elements and the at least one protective glass of the manufacturing facility. Accordingly, for this purpose, the optical sensor device may be configured to be positioned in the free space of the manufacturing facility used for finally focusing the manufacturing light beam onto the manufacturing material, leading to the effect that the sensor device may be able to analyze the protective glass directly, i.e. without the aid of further optics existing within the manufacturing facility. In this respect, the sensor device in this embodiment may have the particular advantage of realizing both a precise and independent detection of potential protective glass states by direct measurement of the one or more protective glasses.

The illumination device of the present analysis device may furthermore, as already mentioned above, be preferably configured to be arranged in one of the previously described positions or free spaces of the manufacturing facility. Preferably, the illumination device may be in particular provided in a free space in which equally the sensor device is existent so that the respective analysis device may be preferentially integrated into the manufacturing facility as a whole, i.e. as a single, physically identifiable object.

The exact positioning of the corresponding device elements of the present analysis device may meanwhile, in order to ensure functionality in different manufacturing facilities, be adapted depending on the setup of the respective manufacturing facility to be equipped while said positioning may preferably at least be realized by means of additional mechanical constructions attached to the device elements (such as adjustable springs, rails or angular mechanisms), resulting in the additional ability of the device elements to be optionally displaced and/or re-orientated in case of need. Furthermore, in order to equally ensure the highest possible safety and detection quality, the previously described device elements may also preferably be attached to additional constructions permanently and, potentially, displacement-freely installed in the manufacturing facility, such as a framework construction, so that any influences affecting the analysis device and reducing its process quality may be likewise reduced to a minimum.

Furthermore, in a particularly preferred embodiment, the analysis device may for this purpose comprise at least one independent protective housing in which the optical sensor device and/or the illumination device may be housed and which may equally be configured to protect the latter from any process emissions occurring in the manufacturing facility, such as dust, fume or material residues. Accordingly, the above-mentioned protective housing may preferably be configured to at least laterally, in particularly preferred embodiments yet also completely (i.e. from all sides), enclose the previously described device elements, so that a preferably inert space may be created.

The determination of the respective condition of the protective glass or the protective glasses to be examined by the analysis device may, meanwhile, preferably be facilitated by evaluating the information generated by the optical sensor device, such as the signal values or the intensity values of the aforementioned image of the respective object plane detected and associated with the protective glass.

In this respect, the analysis device may preferably be configured to at least initially transfer the information described above as digital information files to a storage device provided and connected to the sensor device, so that said information may be stored permanently or for a predefined period of time and thus made available for further evaluation processes. Herein, the communication between the sensor device and the storage device may be established exemplarily via a physical connections, such as a cable or a direct integration of the storage device (e.g., by realizing the storage device as an integrated memory chip or hard disk), or by wireless communication, such as Bluetooth, W-LAN or infrared signaling, so that, depending on the selected embodiment, an extremely efficient data transfer may be enabled at any time.

For further evaluation of the information files stored in this way, the analysis device may thereupon, in a first embodiment, be configured to transmit predefined components of current information or information acquired or processed in the past to a preferably optical output unit, such as a display screen existing at the manufacturing facility, thereby allowing at least a manual assessment of the protective glasses current condition by existing skilled staff members. Accordingly, it may be possible that, by way of example, in the case of an imaging-generating sensor device, the image of the detected object plane generated by the optical sensor device (and consequently the (contamination, damage and/or aging) conditions visible therein) may be generated as a visual, at least two-dimensional image at the output unit, which may subsequently be used, by the assessment of skilled staff members or automated by a corresponding computer program, for an estimation of the current condition of the protective glass. Likewise, the output unit may also preferably be configured to receive information data from a variety of recording steps and/or times and to present corresponding temporal progressions or changes of recorded and/or selected signals to the skilled staff members.

In addition, in a further embodiment, the present analysis device may moreover, instead of or in addition to the above-stated output device configured to output the recorded information for manual analysis, also preferably comprise at least one evaluation unit used for automated evaluation of the aforementioned information. Herein, the evaluation unit itself may preferably be designed as an independent computing unit, for example as a processor connected to the other device elements existing in the analysis device, and may in particular be configured to use the information generated by the sensor device for evaluating the condition of the protective glass by means of computational instructions implemented and/or programmed in the respective evaluation unit.

For this purpose, in a preferred case, the evaluation unit may at least likewise be connected to the aforementioned storage device of the analysis device, thereby enabling the latter to access the information data stored within the storage device and potentially incorporate both, currently captured information and information generated by previous analysis processes into the subsequent evaluation process. Further, in a particularly preferred case, the evaluation unit may also be configured to include other parameters in the process, such as predefined thresholds, physical constants or information resulting from the generation of information files, such as metadata, enabling, in particular, a complex and multi-condition based evaluation mechanism.

The evaluation process itself carried out by the evaluation unit may further initially and preferentially comprise at least a step of determining and outputting a degree of status defining the state of the at least one protective glass, in particular, the state of contamination, deterioration and/or aging found on said glass (hereinafter also referred to as "degree of deterioration", "degree of contamination" or "degree of aging") which may be preferably configured to represent the current condition of the one or more protective glasses and the measures associated with it in a exceedingly simple manner. Accordingly, in a preferred form, said degree of status may be represented, for example, as a simple number, such as in a scale format from 1 to 100, in which a low (degree of status) number represents an inferior condition and a high one represents a good, i.e. preferred, defect-free and/or high quality condition of a current protective glass, thereby allowing a given skilled staff member, upon identification of the outputted respective status degree of the protective glass, to be effectively assisted in both, the evaluation of the current protective glass condition as well as the respective measures to be performed thereupon (e.g. actions such as cleaning or replacing the at least one protective glass). Furthermore, in addition to or instead of the above scale format, the degree of status calculated by the analysis unit may also include more discrete information, such as a statement regarding a particular type of protective glass condition (e.g., "physical deterioration of the protective glass", "identified layers of contamination", "streaks", etc.) or an assessment given by the analysis device for a subsequent course of action (e.g. "continuation of the process", "required cleaning" or "required replacement of the protective glass"), so that even unskilled staff members may identify existing problem sources and efficiently initiate further maintenance processes.

Accordingly, the determination and output of the above-mentioned degree of status by the analysis device may in particular be used to generate an automated and, at the same time, easily comprehensible assessment with regard to the current condition of at least one protective glass detected by the optical sensor device, so that, on the one hand, a point in time required for restoration/cleaning of the protective glass may be accurately estimated, and, on the other hand, the quality of the aforementioned restoration processes may be efficiently monitored so as to realize a smooth and problem-free recommissioning of the respective manufacturing facility. For example, it may be equally possible for the analysis device to be configured, in particular after a corresponding cleaning and/or exchange process of a protective glass, to recheck the degree of status of the processed protective glass and thus, by issuing a discrete statement (e.g., a message such as "cleaning successful/completed", "protective glass still defective", "streaks/damage detected") based on this check, to inform the current operator of the manufacturing facility of possible insufficient cleaning steps or of a failure that occurred during the respective replacement of the protective glass (e.g. a message such as "cleaning successful/completed", "protective glass still defective", "streaks/damage detected"), leading to the effect that any process sequences carried out within the manufacturing facility may be even further improved.

The signal to be detected by the optical sensor device may furthermore, as already mentioned above, preferably be generated by illuminating at least the object plane by means of the illumination device implemented in the analysis device or by means of an external illumination source. For this, in a particularly preferred embodiment, the illumination device may emit monochromatic or multichromatic light at a predefined angle of incidence onto the protective glass or the object plane associated with the protective glass, causing the so generated interactions of the light emitted by the illumination device with the contamination, deterioration and/or aging structures adhering to the protective glass to form a signal field that is dependent on said structures.

In order to determine the current condition of the protective glass described above, or the degree of status to be used for this purpose, the evaluation unit may, in addition, preferably be configured to both, extract and evaluate predefined information from the signal values generated by the optical sensor device, and also compare this information with a plurality of reference information stored in the storage device, such as signal values from previous analysis processes or additional parameters already mentioned above, so that the respective degree of status may be preferably determined at least as a comparative value between the currently detected status of at least one protective glass and a previous point in time, such as a point in time at which the protective glass was in a condition, for example, free of deterioration and/or contamination. Herein, for this purpose, in a particularly preferred embodiment, an already predefined information file may be for example stored in the storage device, which may show the condition of the protective glass, in particular directly after installation in the production machine or a cleaning process, and thus allows the evaluation unit, by adding this information, to calculate the degree of condition as a comparison between the current and an optimum condition.

In addition, as information to be preferably used for determining the degree of status and obtained from the optical sensor device, the evaluation unit may be configured to calculate said degree of status based at least on the intensity values present in the images captured by the sensor device.

For example, in a first embodiment, the evaluation unit may be configured to analyze at least the intensity values within the given image of the sensor device and subsequently calculate the sought degree of status, at least by forming a relative differential value between the above-mentioned intensity value of the current image (for example, by calculating image-related mean values) and that of a previous protective glass state, such as the previously described optimal state. This has particularly the advantage that, due to the given correlation between the light intensity captured by the sensor device and the amount of contamination (that is, the greater the contamination/deterioration/ageing effects, the greater the intensity differences generated by the scattering effects), a simple as well as efficient measure of the contamination, deterioration or aging of the given protective glass may be generated and thus can be made usable for calculating the aforementioned degree of status. Accordingly, the determination of the degree of status in this first embodiment may be at least provided by initially calculating the above-mentioned relative differential intensity value and subsequently converting said value into the sought degree of status by using additional process steps, such as comparing the differential intensity values with predefined threshold values and/or the implementation of further parameters.

Furthermore, in a particularly preferred embodiment, the evaluation unit may be equally configured to include, in particular, any two-dimensional information of the generated image provided by the imaging sensor device into the aforementioned calculation. For instance, the evaluation unit may be capable of using, in addition to or instead of the above-mentioned intensity values, also the number and/or the size of the contamination, deterioration and/or aging structures depicted in the images for determining the degree of status, thereby generating in particular an analysis process that is independent of any optical values and therefore to be seen more precise compared to the state of the art.

For this purpose, the calculation of the degree of status by means of this second embodiment example may accordingly first comprise at least the detection of any structural outlines or geometries located in the respective image, which, preferably, may likewise be carried out as a function of intensity values to be found in the image. Exemplarily, for this purpose, the detection process may comprise a segmentation step in which the evaluation unit may initially extract the intensity values of individual pixels of the image to be analyzed and then identify coherent bodies, such as adjacent pixel groups comprising predefined intensity values or exceeding a certain threshold value, as one of the above-mentioned structural geometries. Accordingly, by means of the so generated additional information (e.g. so generated pixel positions of the pixels belonging to an identified particular pixel group/structure or to a particular intensity value), precise indications of the size, geometry or any agglomeration areas of the contamination, deterioration and/or aging structures detected on a respective image can be generated, which may be equally included in the calculation of the degree of status and thus enable an extremely accurate status evaluation based on direct, i.e. actually existing, properties of the protective glass.

Based on these conditions, the evaluation unit may consequently preferably be configured to integrate at least one of the above-mentioned characteristics of the detected damage, deterioration and/or aging structures, in addition to or instead of the aforementioned intensity values of the image, into the subsequent determination of the degree of status. For example, the degree of status may be defined, at least partially, as a function of the area occupied by the detected structures (preferably relative to the total area of the generated image), so that the degree of status becomes qualitatively lower with increasing coverage of the at least one protective glass. Alternatively, for this purpose, the number of detected structures, their size, shape or also the structure density or the position of the individual structures identified within the image may be included in the calculation and combined with each other via various calculation methods, such as predefined weightings, so that the final degree of condition can also be understood as an evaluation of various conditions occurring on the at least one protective glass.

In this respect, the above-mentioned two-dimensional identification process and the calculation of the degree of condition may offer, in particular, the advantage that an automatable evaluation of the condition of the protective glass can be provided, which may not only use potential effects generated by the contamination, deterioration and/or aging of a protective glass itself, but also include explicit characteristics of the structures located on one or more protective glasses (process emissions, damage spots, local bleaching, etc.) to identify a given protective glass condition.

Moreover, further potential advantages may also result from additional process and/or analysis steps. For example, it may preferably also be possible for the evaluation device, after localizing any structures located on a protective glass, to likewise label the structures with a predefined structure type (e.g., "dust residue," "smudge deposit," "scratch," "crack," "bleaching," etc., for example, by comparing the aforementioned structure geometries) and then to adjust the output of the evaluation unit according to the respectively analyzed structure types. For example, in case of structures identified mainly as dust, the evaluation unit may generate an output for cleaning the protective glass, whereas, in case of identification of a majority of cracks, a replacement of a respective protective glass may be suggested. Accordingly, it is evident that by means of the additional two-dimensional information of at least one protective glass obtained with the aid of the imaging sensor device, an even more detailed analysis (and corresponding treatment steps) may be realized.

Furthermore, in a particularly preferred embodiment, the evaluation device may also be configured to subdivide the image of the detected object plane generated by the optical sensor device into a plurality of different evaluation areas, which, in particular, allows for a separate consideration of local influences acting on a protective glass and thus equally for a more precise evaluation of the respective degree of status. For example, it may be possible that, especially in heatable manufacturing systems, possible structural agglomerations generated by temporary temperature differences may be formed on a protective glass, which may lead to local increases of the structure densities within the generated image, yet only small influences on the general manufacturing quality of the manufacturing facility (e.g. due to the spatially limited structure distributions). In this sense, an additional process step of the evaluation unit may preferably at least comprise the step of identifying the above-mentioned local differences in the structure distribution, preferentially by subdividing the image to be analyzed into a plurality of evaluation areas, and, subsequently, in order to equally include the previously described conditions into the calculation of the degree of status, evaluating the individual evaluation areas at least independently of each other.

Additionally, in a further preferred embodiment, the evaluation unit may also be configured to compare the images to be analyzed, similar to the intensity value analysis already mentioned above, with previous protective glass states, preferentially prior to the localization of the individual protective glass structures. For this purpose, the last-mentioned image may, for example, first be compared with a predefined image which, under the same optical conditions, may reveal an optimum protective glass state so that possible signal values not related to the sought structures, such as intensity gradients or background signals generated by the setting of the analysis device, may be effectively excluded from the further analysis steps. Correspondingly, it may preferably be possible for the analysis unit, prior to a respective structure localization step, to first convert the image to be analyzed into, for example, a difference image based on subtracting the pixel intensity values of the optimal image from the image to be analyzed, thus further increasing the evaluation precision of the previously described degree of status calculation.

The degree of status itself can further be calculated, as already described above, preferably after the respective object plane has been measured by the optical sensor device and the information obtained in this way, be it the calculated degree of status or, for instance, any protective glass characteristics to be taken from the images, may be stored in the storage device after analysis by the evaluation unit. Subsequently, it may also be possible to use the above-mentioned process sequence to create a condition history of one or more protective glasses present in the storage device, which, in addition to the advantage of being able to repetitively use the stored information, for example for the above-mentioned differential image calculation, may also be used to predict future protective glass characteristics.

Thus, in a further preferred embodiment, the analysis device may also be configured to determine the state of contamination, deterioration and/or aging of at least one protective glass, in particular continuously or at predefined time intervals, which allows a precisely defined series of measurements of determined data relating to the state of contamination, deterioration and/or aging to be generated and stored in the storage device for analysis of further protective glass parameters. The series of measurements may preferably comprise time sequences, such as changes in the condition of the protective glass or the degree of status recorded per unit of time, as well as any characteristics of the system present around the protective glass, e.g. manufacturing steps performed over time, t temperatures recorded or mechanical/optical effects on the protective glass, so that, depending on the existing conditions within the respective manufacturing facility, a specific data library tailored to the manufacturing facility may be realized.

In this respect, the analysis device may preferably be configured to use, in particular, the above-mentioned measurement series of past analysis processes within said data library to generate estimates regarding preferred procedures concerning the current protective glass condition. For example, in a preferred case, the analysis device may be configured to compare already existing series of measurements, in particular series of measurements taken within the same or similar manufacturing conditions, with the currently calculated protective glass conditions or degrees of statuses and to calculate, for example by extrapolation of the degree of condition trends to be detected in the series of measurements, a remaining lifetime of at least one protective glass to be obtained on the basis of these past series of measurements. Alternatively, other parameters, such as a preferred period of time until a protective glass needs to be cleaned, repaired or replaced, may also be determined, preferably in addition to the lifetime.

Subsequently, it can be seen that with the aid of the above-mentioned and claimed analysis device, a wide range of preferred advantages over conventional prior art protective glass analysis devices can be generated, which, due to the device elements of the analysis device being both, simple and efficiently integrable into existing manufacturing facilities, may be capable of being highly effectively introducible into preferably any kind of manufacturing facility that is based on optical interactions.

In the following, also a manufacturing system based on the illumination of workpiece materials and/or workpiece elements is claimed, which likewise has the above-mentioned advantages and thus is equally to be distinguished from conventional manufacturing systems.

In this respect, the claimed manufacturing system may at least equally comprise one or a plurality of manufacturing facilities that are based on optical interactions as well as one or more embodiments of the analysis device implemented in the manufacturing facility according to the aforementioned definitions. Accordingly, the manufacturing facility of the claimed manufacturing system may be initially equally considered as at least one device comprising at least one light source for processing integrated workpiece materials and/or workpiece elements, one or more light paths generated by said light source and used to illuminate said workpiece and one or more protective glasses arranged to protect said light source from any deterioration and/or contamination, leading to the effect that the aforementioned manufacturing facility may be preferably identified as any conventional manufacturing facility that is based on optical interactions and known in the prior art.

In a preferred embodiment, however, the corresponding manufacturing facility of the manufacturing system may also be configured in particular to be usable at least for the additive manufacturing of workpieces, such as with the aid of selective laser melting (SLM) processes.

In particular, for this purpose, the manufacturing facility that is based on optical interactions may preferably comprise at least one process chamber in which the workpiece materials and/or workpiece elements required for workpiece manufacturing may be introduced and processed by illumination using the light source. Herein, the process chamber itself may preferably, particularly in order to be able to fulfill the atmospheric conditions required for the SLM process, be designed to be completely closable and preferably equipped with a number of chemical and/or mechanical regulation elements, thus allowing the process chamber of the manufacturing system to dynamically adjust the pressure or the chemical components of the atmosphere existing within the process chamber during any manufacturing processes and hence realizing an extremely stable and error-free manufacturing process. Specifically, for this purpose, the process chamber may also include, for example, various inlet and outlet valves for the import of required process chemicals, such as argon, and may at least be configured to hermetically seal off the manufacturing space defined within the process chamber so that the above conditions are met at any given time during workpiece manufacturing.

Moreover, the one or more protective glasses of the manufacturing facility may, in a preferred embodiment, equally be part of the process chamber. For example, it may be possible that the at least one protective glass may be preferably integrated into the housing of the process chamber or at least be formed in contact with said housing so that the respective at least one light source may direct the manufacturing light path(s) emanating therefrom initially through the protective glass and/or the protective glasses and thus, subsequently, into the process chamber. Accordingly, the setup of the manufacturing facility may also be configured at least in such a way that the light source may guide an emanated light beam directly or via any preferably controllable optical elements through the at least one protective glass and thus, thereafter, allow it to impinge on the processable workpiece material and/or element.

The at least one light source itself may herein, as already mentioned, preferably be designed at least as a radiation source configured for plastic deformation of the workpiece elements, such as a laser, and may preferably be capable of moving and/or focusing the light path generated by the light source preferably in any three-dimensional direction via controllable optical elements (lenses, filters, mirrors, condensers, etc.) integrated in the radiation source or positioned externally. Further alignments of the beam system generated in this way may also be realized in a mechanical manner, for example by moving one or a plurality of illumination housings containing the optical elements and/or the light source of the manufacturing facility, so that focusing of the material can be accomplished on both a mechanical and an optical basis.

Meanwhile, the at least one analysis device of the manufacturing system may, as described, be configured to be integrated into the manufacturing facility of the manufacturing system, preferably in one of the free spaces existing in the manufacturing facility. For example, the at least one analysis device may preferably be positioned in the present manufacturing system at least between the light source or the illumination housing enclosing the light source and/or the optical elements of the light source and the above-mentioned process chamber, so that the analysis device may in particular be designed as a unit insertable between the aforementioned two elements. In a particularly preferred embodiment, it may yet also be possible that the at least one analysis device may be integrable between a plurality of light sources or illumination housings and the aforementioned process chamber.

The various device elements of the one or more analysis devices, but at least the optical sensor device, may further be equally preferably positioned between the process chamber and the at least one light source of the manufacturing system, analogous to the embodiments described above, and enclosed, for example, by the protective housing of the analysis device.

The particular position of the illumination device of a respective analysis device may moreover preferentially vary, depending on the preferred type of illumination. Accordingly, for instance, in a preferred case of incident light illumination usages, the illumination device may preferably be mounted along the side of the respective protective glass facing the corresponding optical sensor device, so that it is possible to position both the optical sensor device and the illumination device in a shared space, such as the protective housing of the respective analysis device. In the case of transmitted light illumination, on the other hand, the illumination device may preferably be positioned on the opposite side of said protective glass, for example in a separate space within the process chamber, which makes it also particularly possible to directly illuminate the side of the at least one protective glass affected by deterioration or contamination. In addition, as a third preferred embodiment, it may yet also be possible, specifically in order to realize an even more uniform illumination emanating from the side of a respective protective glass, for the illumination device to be configured to be incorporated into the body of the process chamber, for example into the housing or its outer wall, so that not only an extremely space-saving but also stable integration of the illumination device may be realized.

Further advantages of the manufacturing system may moreover also arise from possible interactions between the manufacturing facility and the integrated at least one analysis device. Specifically, the analysis device may, for example, be configured to preferably exchange machining and/or process signals with the optical interaction-based manufacturing facility so that corresponding analysis processes of the one or plurality of analysis devices may be efficiently coordinated with existing manufacturing steps carried out by the manufacturing facility. Accordingly, the at least one analysis device may be configured, by way of example, to receive and/or send back to the manufacturing facility at least information relating to existing working processes of the manufacturing facility, so that the determination of the state of contamination, deterioration and/or aging of the at least one protective glass carried out by the analysis device may be executed, in particular automatically, according to predefined manufacturing processes, for example before the start, after the completion of a workpiece production or during predefined waiting times. Conversely, however, the manufacturing facility may also be configured to adapt its manufacturing process to the designs of the analysis device(s) on the basis of information obtained by the analysis device, thereby enabling extremely efficient and, in particular, dynamically operating interaction of a respective analysis device with the existing manufacturing processes of the manufacturing facility.

Accordingly, it may be exemplary possible for the manufacturing facility to regularly receive, for example at predefined time intervals, information regarding the current state of a protective glass implemented in the manufacturing facility by the at least one analysis device and to dynamically align the current manufacturing process and/or a manufacturing process to be performed in the future according to the aforementioned information. In this way, for example, the manufacturing facility may preferably be configured, after receiving a negative protective glass evaluation (for example, after detecting a local burn-in or a crack), to avoid any light paths potentially interacting with the detected problem source (e.g., by changing the used light path geometries) or to automatically redistribute an ongoing machining process to other light sources or light paths unaffected by the previously described problem source, so that a permanently constant machining quality can be ensured even during an ongoing manufacturing process. In addition, analogous to the above-mentioned device elements, also individual manufacturing steps and/or process parameters, such as the intensity or diameter of the manufacturing light beam, may be preferably adapted based on individual information generated by the at least one analysis device, thereby achieving maximum adaptability of the manufacturing facility with respect to occurring protective glass conditions.

Further interaction steps between a respective analysis device and the manufacturing facility may moreover preferably be designed in such a way that, in particular, the accuracy and comparability of the information generated by the analysis device may be optimized in the best way possible, for example in order to permit a preferential error-free comparison of images of current protective glass states with such of a corresponding optimum protective glass state. For this purpose, the manufacturing system may be for instance configured to carry out the analysis performed by the analysis device at least under constantly identical conditions prevailing in the manufacturing system, such as existing background illuminations, workpiece positions or manufacturing process times, which may minimize potential interfering signals captured within the recorded images and, thus, equally improve the quality of final image products such as the generated differential images described above.

In addition, in order to circumvent particularly the background illumination of the protective glass generated by the light source or within the process chamber of the manufacturing facility, the manufacturing system may also preferably be configured to perform the detection of the respective protective glass object plane by an optical sensor device only when the light source is switched off or covered. In this respect, a process step of the manufacturing system prior to the analysis of the at least one analysis device may likewise at least comprise the step of switching off and/or covering the light source or any other light-emitting objects in the corresponding system so as to enable constant optical conditions impinging on the optical sensor device.

Moreover, in a particularly preferred embodiment, the manufacturing system may also comprise further device elements for the above-mentioned purpose, such as a shutter or sliding element mounted in the manufacturing facility for shielding one or a plurality of analysis devices, but at least their optical sensor devices, from illumination emanating from the manufacturing facility. Specifically, this shutter or sliding element may be designed, for example, as an moveable and/or pivotable object that may be preferably built by non-reflective or highly absorbent materials, such as a black anodized plate or optical filter elements, and may be moved in front of the respective analysis device, the at least one protective glass or the optical device in order to shield the optical sensor device from disturbing light paths normally detected by the optical sensor device. Accordingly, the shutter or sliding element may preferably be configured to be movable at least from a first position for shielding said at least one analysis device to a second position for re-exposing said analysis device at least from the side of the process chamber and/or the light source and back, thereby realizing both the above-mentioned constant requirements necessary during detection by the analysis device as well as the re-exposure of given light paths required for the general manufacturing process of the corresponding manufacturing facility. In addition, preferred positions of the shutter or sliding element may further preferably be selected depending on the illumination type of the illumination device as described above, but may include at least the positioning of the shutter or sliding element in the process chamber or in or on the corresponding analysis device.

Furthermore, the respective process steps performed to determine the state of contamination and/or damage of the at least one protective glass in the manufacturing facility of the respective manufacturing system may preferably be similar to those of the previously described functions of said analysis device. Accordingly, the process steps equally claimed hereby and generated by the at least one analysis device of the present invention may comprise at least one of the following steps:

detecting an object plane of the protective glass of the manufacturing facility by an optical sensor device;

illuminating the object plane by an illumination device;

evaluating information obtained by detecting the object plane of the protective glass by an evaluation unit, the evaluation of the information comprising at least the step of analyzing intensity values of the detected light;

detecting the state, in particular the state of contamination, deterioration and/or aging, of the at least one protective glass by the analysis device in-between predefined manufacturing processes of the manufacturing facility;

determining a state of contamination, deterioration and/or aging of a protective glass by comparing the information obtained by detecting the object plane by the optical sensor device with predefined reference information, such as threshold values;

determining lifetimes of the at least one protective glass in use based on a plurality of information regarding the contamination and/or deterioration state of the protective glass obtained by the at least one analysis device.

BRIEF DESCRIPTION OF THE FIGURES

FIG. 6A: shows the detailed view of the analysis device of FIG. 3A, wherein an additional movable shutter or sliding element is positioned within the process chamber;

FIG. 6B: shows the embodiment of FIG. 6A as a detailed view in a horizontal cross-section;

DETAILED DESCRIPTION OF PREFERRED EMBODIMENTS

In the following, embodiments of the present invention are described in detail based on exemplary figures. The features of the embodiments may be combined in whole or in part and the present invention may not be limited to the described embodiments.

Figure 1:
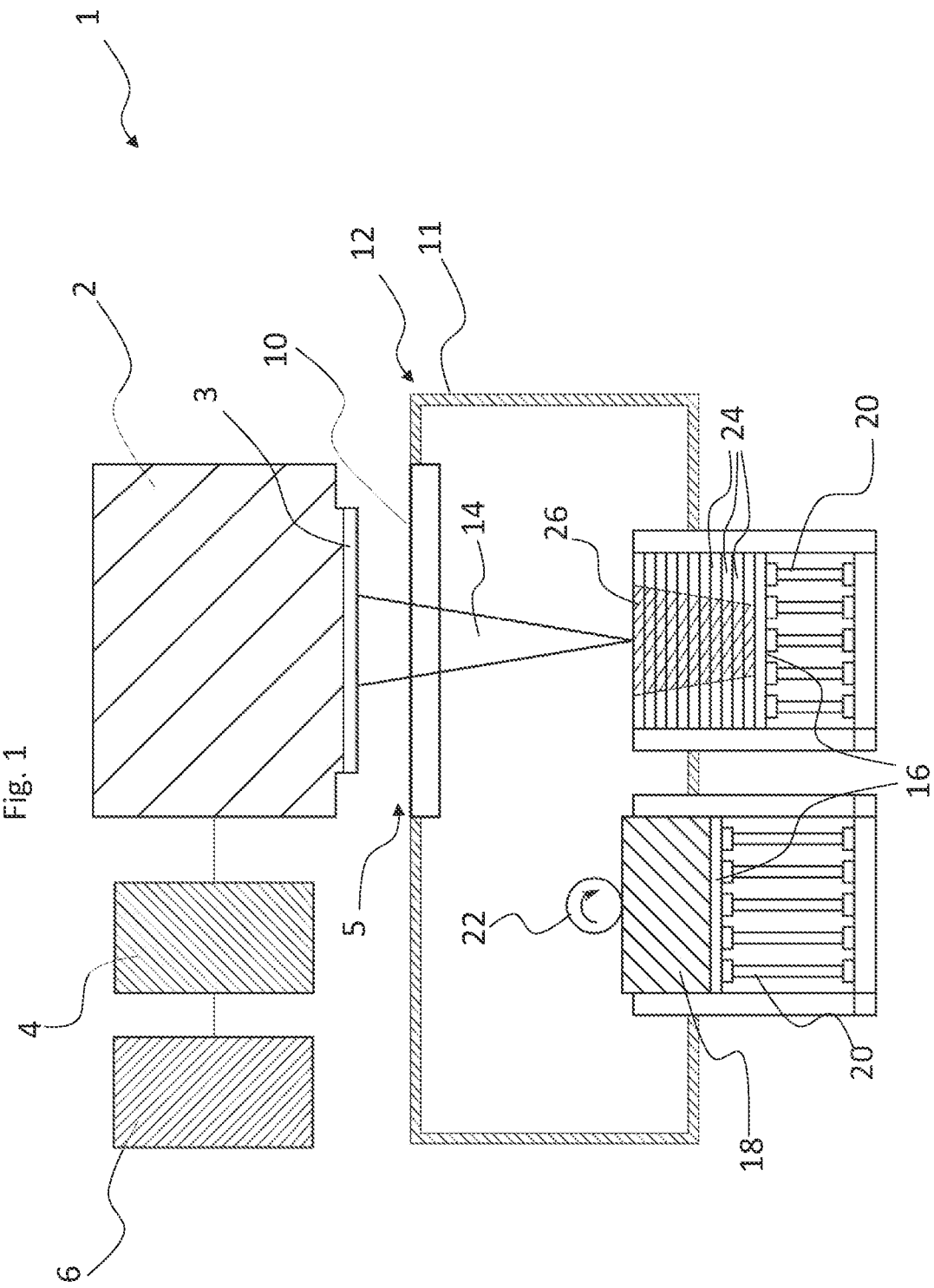
FIG. 1: shows a two-dimensional view of an manufacturing facility that is based on optical interactions, in particular an SLM facility.

FIG. 1 shows a schematic embodiment of a manufacturing facility 1 based on optical interactions, in particular a manufacturing facility for selective laser melting in which a processible raw material 18 is deposited by layers on a movable base plate 16 and is locally remelted by focused laser irradiation in such a way that, through continuous deposition, illumination and melting processes of subsequent material layers 24, a three-dimensional workpiece 26 may be generated (additive manufacturing).

For this purpose, the manufacturing facility 1 comprises at least one (laser) light source 4, which generates a light beam modified for interaction with the material layers 24 via a control system 6 coupled to the manufacturing facility 1, wherein said light beam is focused onto the material layer currently to be processed via a light path 14 by means of various optical elements integrated in a scanning head 2, such as focus or scattering lenses, mirrors, optical filters, etc. In this case, the scanning head 2 itself is an independent, rigid housing in which the optical elements can be controlled manually and/or automatically and thus, depending on their current orientation and the optical properties assigned to them (e.g. focus lengths or filter frequencies), generate the three-dimensionally positionable light path 14.

In addition, in order to ensure suitable protection of the optical elements described above from potential process emissions, the scanning head 2 in the present embodiment is herein designed as a closed or lockable system, in which the light path 14 may be solely guided out through an exit hole provided by a scanning head glass 3 of the scanning head 2. In further embodiments, however, it may also be possible for the optical elements to be designed as a free-standing or open device system or to be at least partially integrated into other entities of the manufacturing facility 1, such as the light source 4. Also, in this case, the display of the light source 4 may serve only visual purposes, so that the latter may be equally be designed to be integrated into the scan head 2 or other elements of the manufacturing facility 1.

Moreover, conditioned by the above-mentioned working distances of the optical elements implemented in the scan head 2, the light path 14 used for manufacturing the workpiece 26 passes through the scan head glass 3 into a processing chamber 12 distant from the scan head 2 via a free space 5, in which the different layers of processible raw materials 24 are deposited on a movable base plate 16 and focused by the manufacturing light beam for workpiece production. Further, the exact manufacturing procedure may be, as mentioned before, best described as an iterative coating and exposure process: in order to produce any three-dimensional workpiece 26, the material to be processed is initially deposited in a thin layer powder form 24 on a base plate 16 and positioned to a processing height corresponding to the respective light path 14 by at least vertical movement of the base plate 16 using controllable lifting devices 20 (e.g. pneumatic, electric or mechanical cylinder or scissor lifting devices). In addition, in order to guarantee a uniform and dense material layer 24, the corresponding powdered material 18 is compacted beforehand by means of at least a roll 22 (alternatively by means of further devices such as integrated silicone lips) which can be moved parallel to the material layer 24, and the powdered material 18 is brought to a predefined layer height and removed from excess material 18, so that constant material conditions may be guaranteed within each iteration process.

Thereafter, the machined powdered material layer 24 may be locally remelted by means of the aforementioned light beam focused via the light path 14, leading to the effect that, after solidification, the powdered material layer 24 may form a solid material layer. Subsequently, the base plate 16 is lowered by a predefined thickness height of the material layer 24 and a new material layer 24 is deposited on the base plate 16 so that, by repeatedly machining and adding new material layers 24, a merged, three-dimensional item (the workpiece) 26 can be generated.

Further, in order to enable the atmospheric conditions suitable for the above-mentioned SLM manufacturing process, the process chamber 12 of the manufacturing facility 1 is designed as a fully closable processing housing equipped with additional regulatory elements, such as, for example, pressure regulators or valves set up for importing or exporting required processing chemicals (e.g. argon, neon, etc.) and may completely enclose the above-mentioned base plate 16 by integrating the latter into the process chambers body 11 (i.e. at least the process chamber outer wall), thus providing a manufacturing area capable of being sealed off from external influences. Furthermore, in order to equally allow the light path 14 to come into contact with the various material layers 24, a protective glass 10 is incorporated into the body 11 of the process chamber, which, due to its optical properties, is at least configured to both, allow the emanated light beam of the light source 4 to enter the process chamber 12 as well as to shield the respective elements of the manufacturing apparatus 1 mounted in the scan head 2 from potential process emissions 28 (powder residues, fumes, sparks, etc.) occurring during workpiece generation.

Accordingly, as already mentioned above, the problem arises in conventional manufacturing facilities 1 that are based on optical interactions and known by the prior art that, due to the simultaneous protective as well as transmission function of the protective glass 10 introduced into the process chamber 12, the manufacturing quality of the manufacturing facility 1 may noticeably deteriorate due to emission particles 28 accumulating on the protective glass 10 (and thus interacting with the manufacturing light path 14). On the other hand, however, in most cases, any cleaning and/or replacement processes affecting the protective glass 10 also turn out to be associated with immensely high costs and downtimes of the manufacturing facility 1, so that it is of utmost importance for present manufacturing facilities 1 to implement a method for identifying any (contamination and/or deterioration) conditions, and thus to generate an indication for appropriate maintenance measures that is as accurate as possible. As a consequence, to overcome this problem, the analysis device D of the present invention is proposed.

Figure 2:
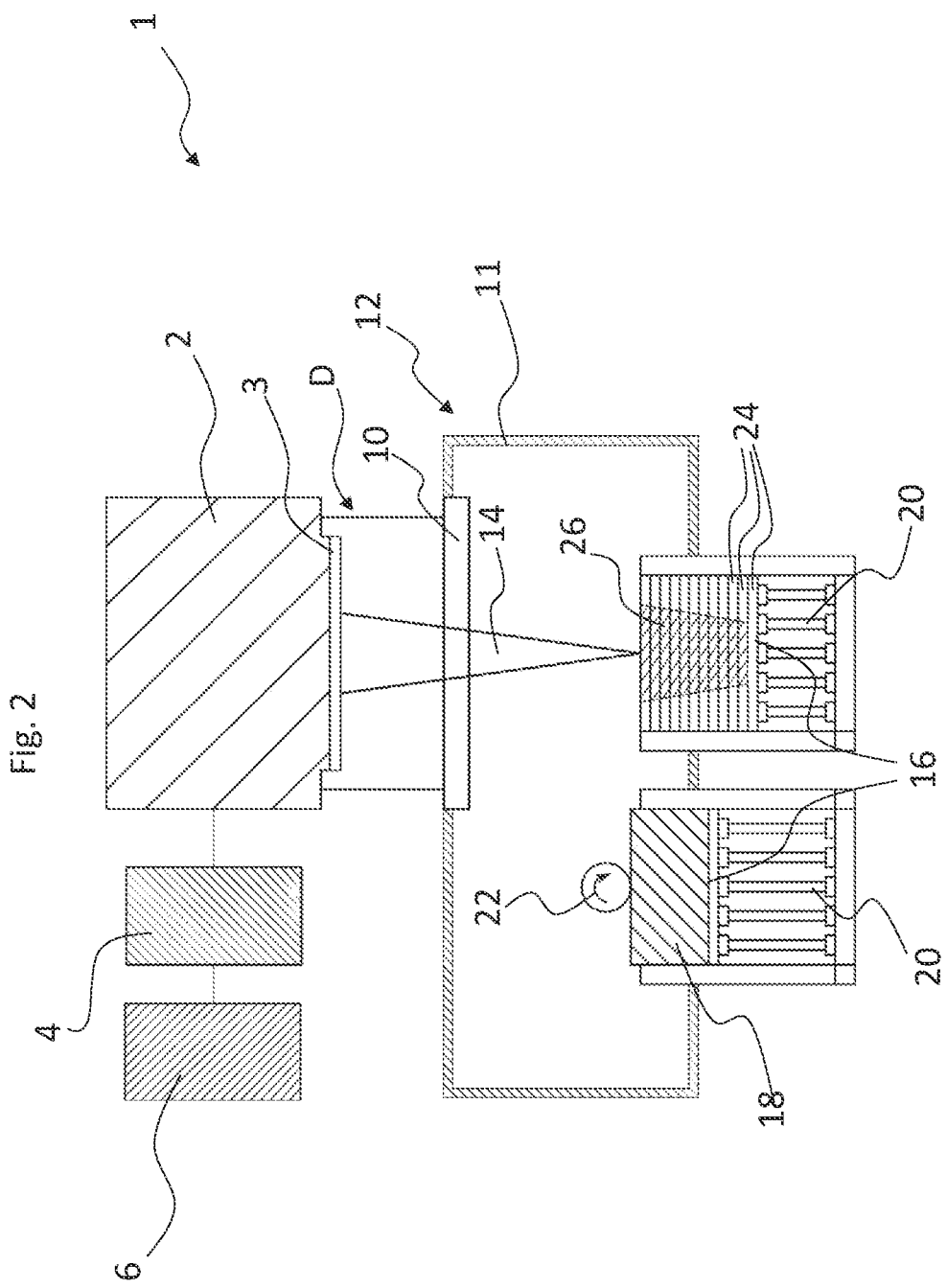
FIG. 2: shows a two-dimensional view of a manufacturing system of the present invention.

FIG. 2 shows a first schematic representation of the manufacturing system of the present invention, in which the analysis device D is shown integrated in the manufacturing facility 1 of FIG. 1. As can be seen, the analysis device D is specifically implemented in the free space 5 caused by the optical properties of the manufacturing facility 1, so that the latter is particularly positioned along the light path 14 and is preferably detachably connected to the scan head 2 as well as to the process chamber 12 of the manufacturing facility. In this respect, this embodiment of the manufacturing system possesses the advantage that, by utilizing already existing free spaces within the manufacturing facility 1, no further (for example optical) adaptations of the manufacturing facility 1 are necessary for implementation of the analysis device D, which allows the analysis device D to be extremely easily and efficiently integrated into an existing manufacturing process.

Figures 3A, 3B:
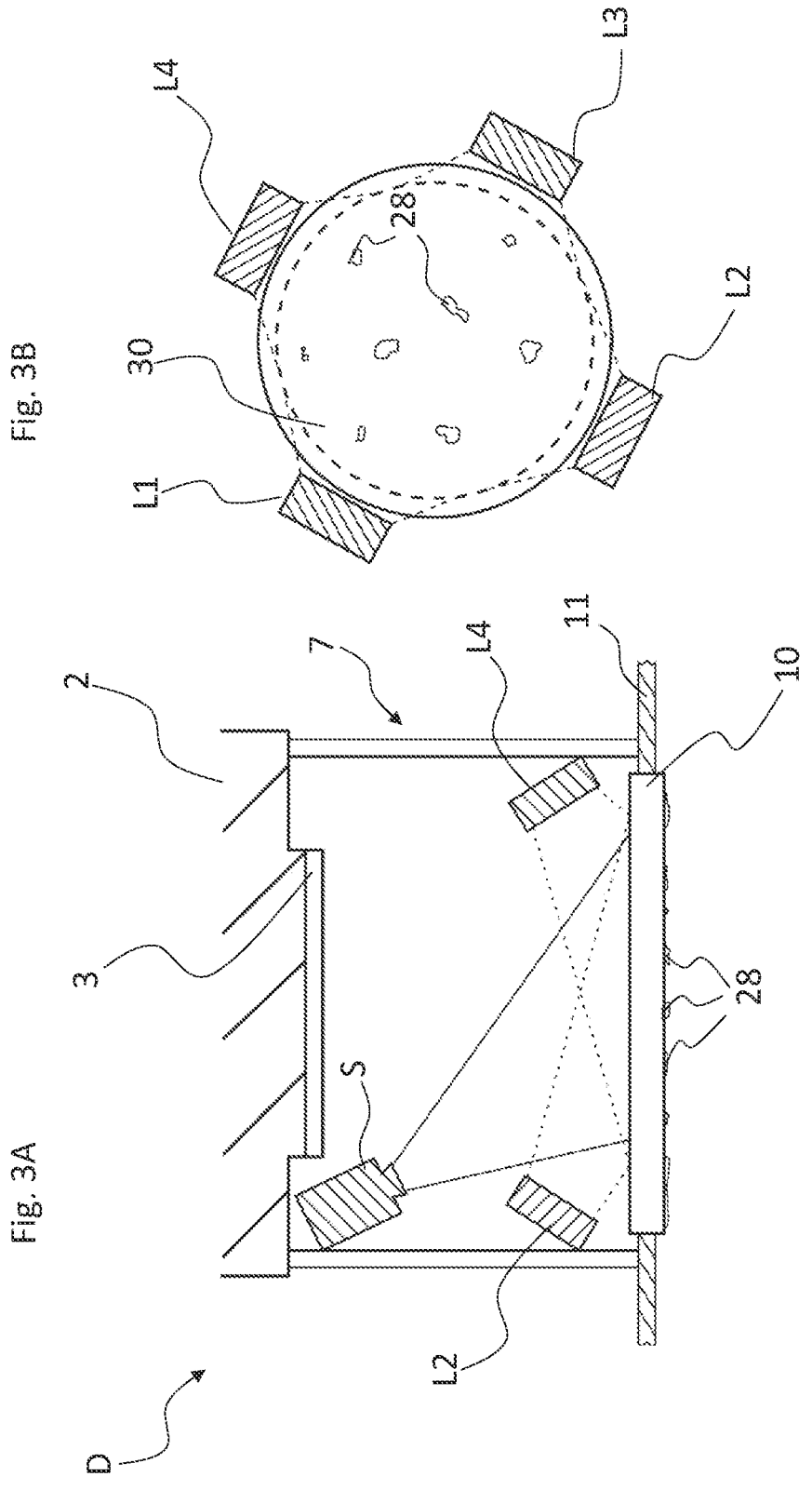
FIG. 3A: shows a detailed view of a first embodiment of the analysis device in a vertical cross-section, in which the illumination devices are positioned within the protective housing of the analysis device.
FIG. 3B: shows a detailed view of the embodiment of FIG. 3A in a horizontal cross-section.

In addition, FIGS. 3A and 3B show a detailed schematic representation of a first embodiment of the analysis device D shown in FIG. 2 integrated in the manufacturing facility 1, respectively in a horizontal and a vertical cross-section. As mentioned above, the analysis device D is in this case implemented in the free space 5 between the scan head 2 and the process chamber 12 and thus only occupies unused areas of the manufacturing facility 1 for the analysis of the protective glass condition. Herein, the analysis device D itself comprises at least the optical sensor device S, which is an imaging sensor device provided with optics (focus lenses, mirrors, filters, condensers, etc.) and, in arbitrary cases may also be defined as an arbitrary camera device, as well as a plurality of illumination devices L1-L4 for illuminating the protective glass 10 to be analyzed by the optical sensor device S. In addition, in order to shield the above-mentioned device elements of the analysis device D from external influences, such as dust or harmful exposures, the optical sensor device S and the illumination devices L1-L4 are arranged in a protective housing 7 of the analysis device D, which is formed, for example, in the shape of a tube, and whose outer wall is connected to both the scan head 2 and the outer process chamber structure 11, thus forming a sealed connection system. Furthermore, due to the respective positioning of the protective housing 7, equally the side of the scan head glass 3 facing outwards as well as the protective glass 10 of the process chamber 12 are integrated into the enclosed area of the analysis device D, resulting in additional protection of these elements.

The exact positioning of the optical sensor device S and/or the illumination devices L1-L4 of the analysis device D may further vary depending on the setup of the manufacturing facility 1, yet, in case shown in FIG. 3A or 3B, may be at least designed in such a way that the optical sensor device S is positioned above the illumination devices L1-L4, for example on the inside of the protective housing 7. Furthermore, the illumination devices L1-L4 used for illuminating the protective glass 10 are configured to be positioned at uniform distances, for example, symmetrically (see FIG. 3B) within the protective housing 7, and may be likewise oriented in such a way that the protective glass surface illuminated in a given manufacturing process may not be impaired, in particular in order to be able to generate a homogeneous exposure area. As a consequence, with the implementation of the above-mentioned device elements defined by the analysis device D, a device system may be generated which both, enables efficient and extremely accurate detection of the sought protective glass condition and, due to the interaction-free positioning of the latter elements, also a simple protective glass evaluation compatible with any given manufacturing process.

Moreover, the evaluation process of the protective glass 10 performed by the analysis device D is carried out in the embodiment example shown in FIGS. 3A and 3B by analyzing the reflected light images captured by the optical sensor device S: the optical elements of the optical sensor device S and the illumination devices L1-L4 used for focusing and adjustment and/or the general orientation of the latter device elements are first oriented in such a way that a specific plane, the object plane 30 (see FIG. 3B), of the protective glass 10 is focused by the optical sensor device S and illuminated with the aid of the illumination devices L1-L4, so that given structures of contamination, deterioration and/or aging 28 (material residues, smut, scratches, bleaching, etc.) accumulated on the side of the protective glass 10 facing the process chamber 12 are uniformly illuminated from the outside of the process chamber 12 and the scattered light thus generated by the structures may be fed back to the imaging sensor element of the optical sensor device S as a location-dependent signal. Accordingly, an at least one, yet, in a preferred case, two-dimensional signal (i.e. an image) of the priory focused object plane 30 can be generated within the optical sensor device S, in which the respective structures of contamination, deterioration and/or aging 28 lying in the object plane and illuminated by the illumination devices L1-L4 may be represented as patterns of comparatively high signal or intensity values and thus become analyzable for continuing condition evaluation of the respective protective glass.

Thereafter, as already mentioned above, the state of the protective glass is determined by evaluating the information obtained in the generated image, specifically by calculating a degree of status that is dependent on a plurality of imaging parameters and describes the current state of quality of the protective glass 12, which, in the present invention, may be generated either manually, e.g., by outputting and examining the image by skilled staff members, or automatically on the basis of an evaluation unit (not shown) implemented in the analysis device D. Suitable examples of the above-mentioned imaging parameters may in particular represent characteristics specifically related to the captured structures 28, such as the number, size, shape or density of the contamination, deterioration and/or aging structures 28 located along the object plane 30 (and thus along the protective glass 10), but also characteristics based on optical influences, such as the intensity values associated with the structures 28 within the generated image are possible, which particularly enable an evaluation of the state of the protective glass as a function of direct factors associated with the corresponding contaminations and/or deteriorations.

Moreover, in order to determine the previously described properties, the evaluation unit of the analysis device D is equipped with a series of image analysis and processing programs, which allow the evaluation unit, for example, via various pixel segmentation and evaluation processes, to identify the corresponding individual structural objects within the generated image and to extract required evaluation parameters from them. Furthermore, for improved identification of any of said structures, the evaluation unit may equally adapt the aforementioned image in advance using a plurality of processing mechanisms, for example background corrections, edge filtering and/or blur corrections, or convert the former into a different image format, for instance, by forming the difference image described above, thereby enabling an even more precise analysis of the protective glass 10.

Furthermore, in a final step, the evaluation unit is configured to convert the above-mentioned imaging parameters into an easily understandable degree of status, such as a percentage that decreases with the condition of the protective glass 10, a normative quality statement (e.g. "protective glass clean", "protective glass damaged", "protective glass dirty") or a suggested treatment step ("cleaning necessary", "replacement necessary" etc.), so that, by outputting the degree of status by the analysis device D, a selected skilled staff member may be quickly and effectively informed about necessary protective glass treatment steps to be carried out. In case of the above-mentioned statements or proposed treatment steps, this may be, for example, achieved by comparing the identified imaging parameters with arbitrary and adapted threshold values, so that, for instance, after exceeding a certain number, density or sizes of identified damage, contamination and/or aging structures, the analysis unit may issue a request for cleaning or replacement of the respective protective glass 10. Moreover, in the case of a plurality of imaging parameters to be integrated for the calculation of the degree of status, the respective evaluation unit may initially also be configured to combine any of the aforementioned parameters via a preceding combination step, for example by means of weighted and/or previously relativized averaging processes, so that in the present invention it may be equally possible to incorporate various parameters to be identified in the generated image for a protective glass status determination.

Accordingly, the embodiment of the analysis device D shown in FIGS. 3A and 3B provides an integrable protective glass examination unit which is capable of both, being easily and extremely efficiently incorporatable into existing manufacturing facilities 1 as well as determining current conditions of a protective glass 10, specifically by incorporating primary parameters, i.e. parameters explicitly existing on the protective glass 10, for the respective state assessment.

Figures 4A, 4B:
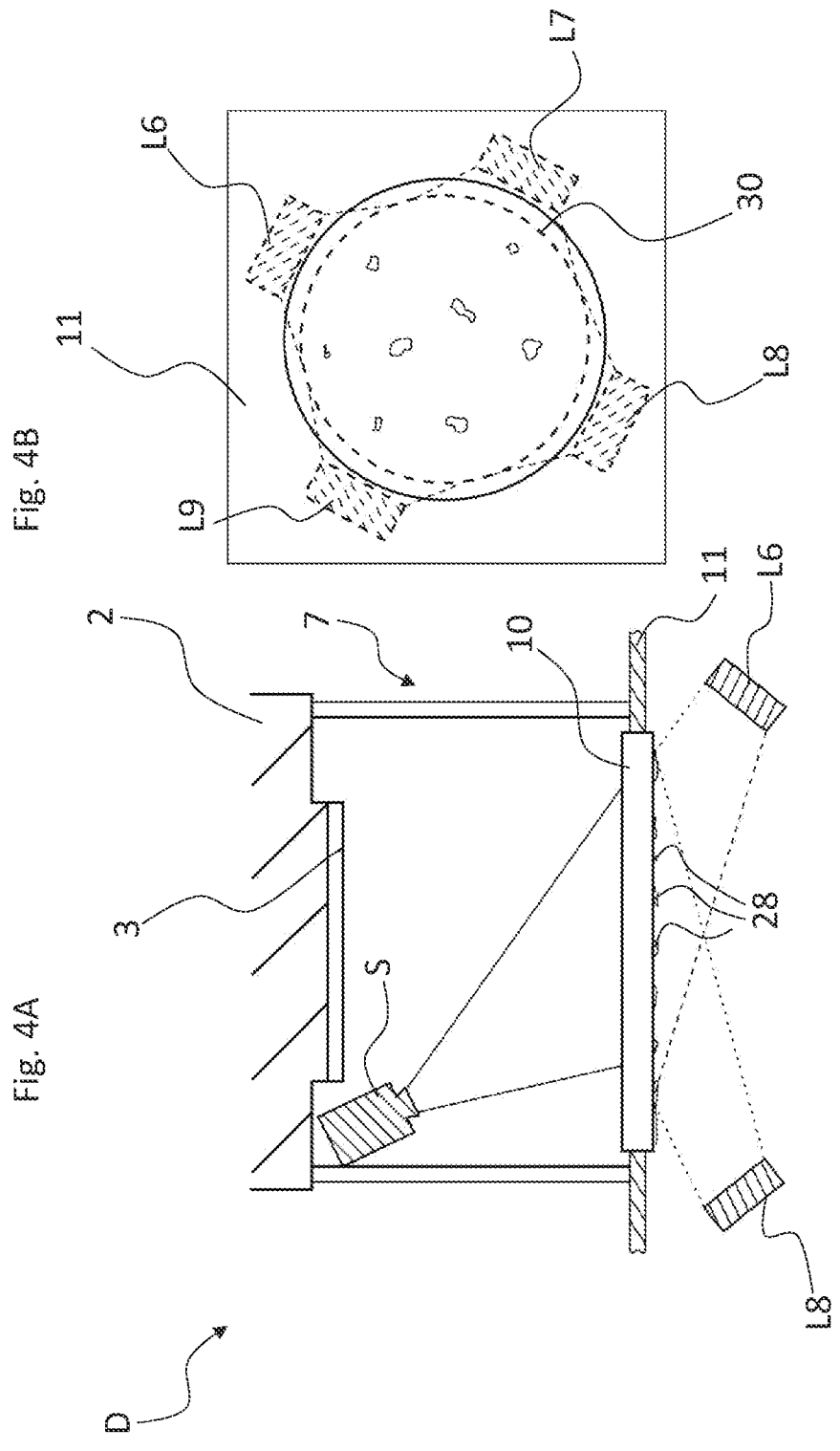
FIG. 4A: shows a detailed view of a second embodiment of the analysis device in a vertical cross-section, in which the illumination devices are positioned in the process chamber.
FIG. 4B: shows a detailed view of the embodiment of FIG. 4A in a horizontal cross-section.

Moreover, FIGS. 4A and 4B show an additional embodiment of the previously described analysis device D, in which, instead of the incident light illumination used in FIGS. 3A and 3B, a transmitted light illumination implemented for the identification of potential contamination, damage and/or aging structures 28 is provided. Accordingly, the analysis device D of these figures differs in such a way from the aforementioned embodiment that, in particular, the positions of the illumination devices L6-L9 used for illuminating the protective glass 10 have been arranged inside the process chamber 12 and thus, compared to the optical sensor device S, on the other side of the protective glass 10.

In this respect, the illumination devices L6-L9 of this embodiment are, in order to detect the particles 28 located on the protective glass 10, configured to illuminate the protective glass 10 particularly from the wetted/contaminated side so that a large part of the light emitted by the illumination devices L6-L9 equally passes through the protective glass 10 into the beam path of the optical sensor device S and is only reflected or scattered at locations contaminated by the particles 28. Accordingly, within the image generated by the optical sensor device S, in this case, an image contrary to the previous embodiment is obtained, in which unaffected portions of the detected protective glass 10 are represented as a high-signal or high-intensity background while positions associated with the respective contamination, deterioration and/or aging structures 28 are represented as low-signal/intensity objects. Consequently, also in this embodiment, the status of the corresponding protective glass 10 can be effectively determined, specifically by means of the previously mentioned calculation of the degree of status, since the analysis device D of this embodiment may equally realize a spatially resolved representation of existing contamination, deterioration and/or aging structures 28.

Figures 5A, 5B:
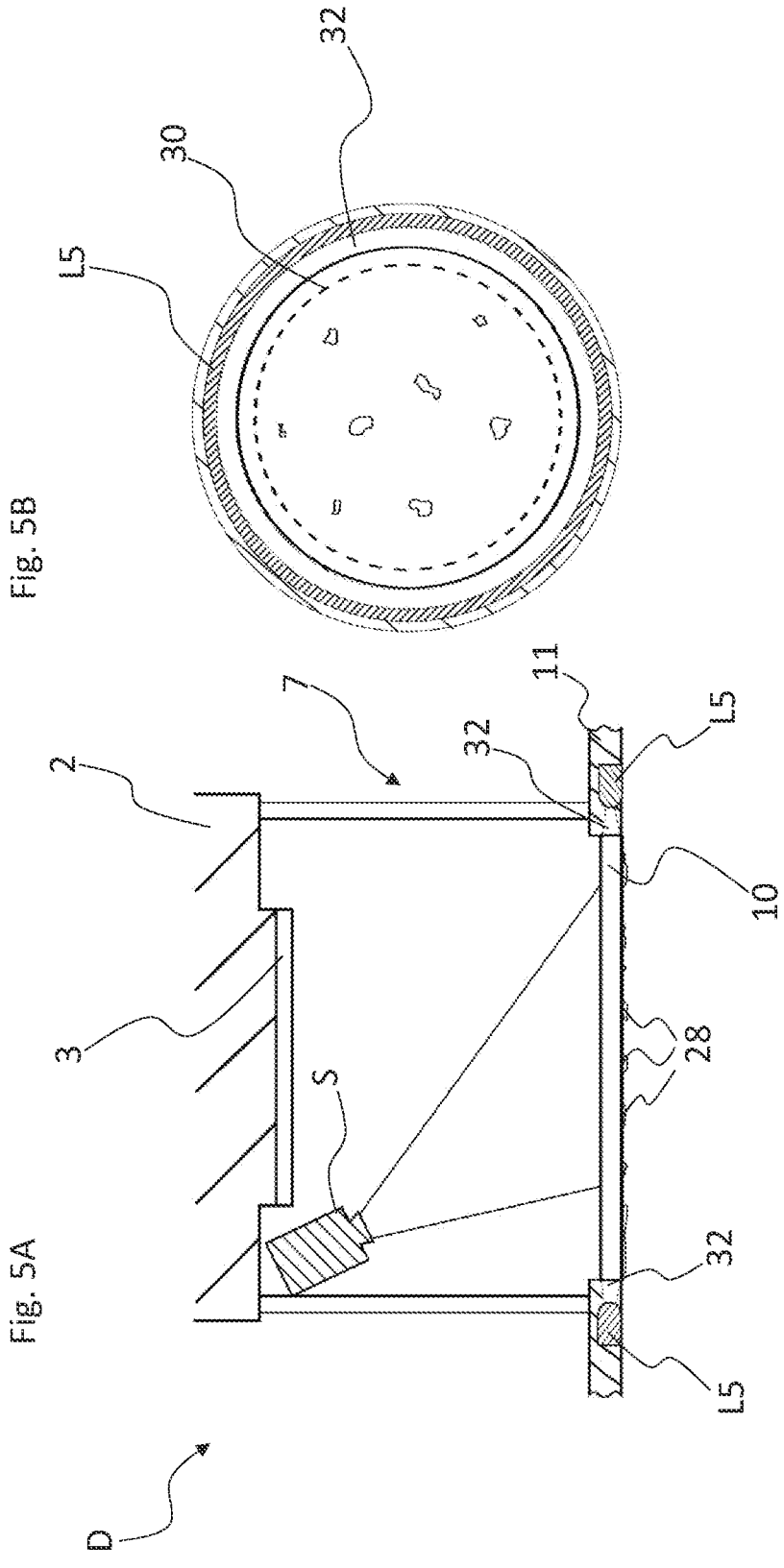
FIG. 5A: shows a detailed view of a third embodiment of the analysis device in a vertical cross-section, in which the illumination devices are integrated into the body of the process chamber.
FIG. 5B: shows the embodiment of FIG. 5A as a detailed view in a horizontal cross-section.

In addition, FIGS. 5A and 5B show a yet another embodiment of the present analysis device D, in which the illumination device L5, in contrast to the preceding examples, is shown to be integrated into the process chamber housing 11 and thus allows the protective glass 10 to be illuminated uniformly, in particular from the outside of the protective glass in a radially inward direction, by an illumination beam 32 oriented parallel to the protective glass 10. For this purpose, the illumination device L5 is herein designed as an integrated illumination ring surrounding the protective glass 10 (i.e. by completely and laterally enclosing the protective glass), which, in this embodiment, is depicted as a circular body. In other embodiments it may yet equally be possible that the illumination device may be defined by different structural geometries, in particular such that may be adapted to the design of the corresponding protective glass 10. In this respect, the advantages of this illumination devices L5 embodiment integrated into the manufacturing system 1 may arise specifically from the fact that the aforementioned illumination device can be introduced into the manufacturing system in an extremely efficient and space-saving manner, while the above-mentioned type of illumination equally permits an evaluation of the protective glass compatible to the aforementioned image analysis and degree of status calculation process. In addition, there is the positive effect that the lateral illumination of the protective glass 10 (lateral scattering of light introduced into the protective glass, in particular by the annularly arranged LEDs) illuminates both, the side of the protective glass 10 facing the process chamber 12 as well as the side facing the analysis device D, thereby effectively preventing any defect-generating processes, such as back reflections, on the outer sides of the protective glass.

FIGS. 6A and 6B further show again the embodiment of the analysis device D shown in FIGS. 3A and 3B, in which, in addition to the illumination devices L1-L4 and the optical sensor device S, a shutter or sliding element 36 being movable along the longitudinal axis of the protective glass 10 (here shown as a black-anodized and thus reflection-free plate) has been inserted into the process chamber 12. In this case, the shutter or sliding element 36 comprises, in particular, a controllable drive mechanism 34 (e.g., a pneumatic, electric or mechanical motor element) coupled to the manufacturing process of the manufacturing system 1, which allows the shutter or sliding element 36 to move parallel to the orientation of the protective glass 10 at least from a first position for shielding the protective glass 10 from any illumination sources located in the process chamber 12 to a second position for reopening the light path 14 between the scan head 2 and the process chamber 12 and back. Accordingly, the shutter or sliding element 36 additionally implemented in the manufacturing system 1 may be configured, in the first position, to block any illumination emanating from the process chamber 12 and potentially being captured by the analysis device D, which, especially for the image acquisition of the aforementioned object plane 30 by the optical sensor device S, may efficiently block potential interfering signals and thus realizes more consistent environmental conditions for the aforementioned image generation. In this respect, the protective glass evaluation process performed by the analysis device D in the respective embodiment is designed in such a way that the shutter or sliding element 36 is moved to the first position whenever the protective glass 10 is to be examined by the analysis device D and returned to the second position whenever the light path 14 defined by the protective glass 10, e.g. in case of a manufacturing process, should be left unobstructed. Consequently, also in this case, an improvement of the protective glass analysis process can be made possible without the need of modifying and/or adjusting already existing manufacturing mechanisms of the aforementioned manufacturing system 1.

Figures 7A, 7B:
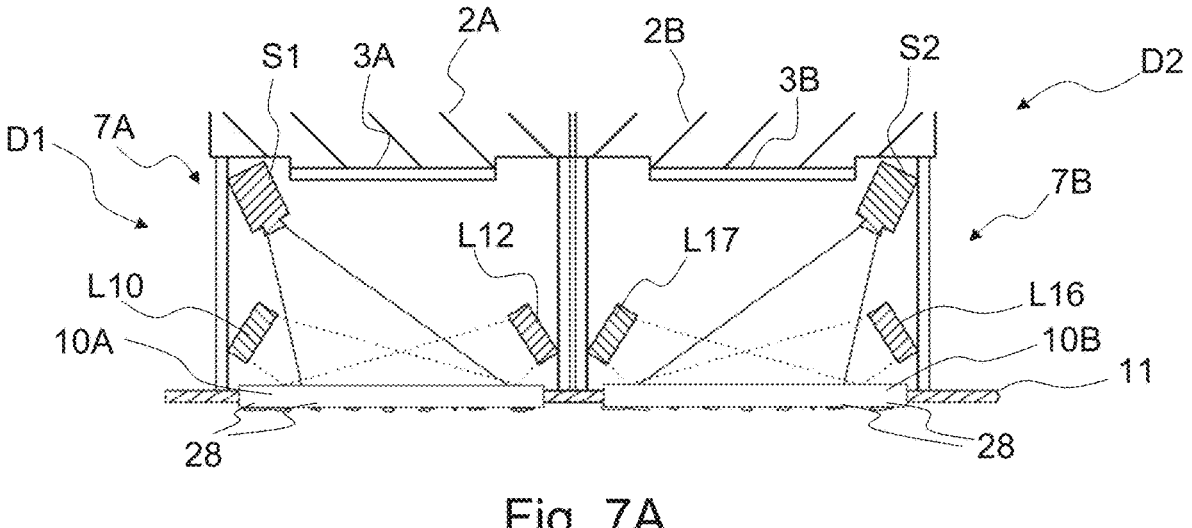
FIG. 7A shows a further embodiment of the analysis device, in which the protective glass is analyzed by several independent sensor devices.
FIG. 7B shows the embodiment of FIG. 7A as a detailed view in a horizontal cross-section.

In addition, FIGS. 7A and 7B show yet another detailed representation of an embodiment of the claimed manufacturing system, in which the present manufacturing facility 1, in comparison with the previous embodiment examples, comprises a plurality of scanning heads 2A & 2B as well as protective glasses 10A & 10B and is consequently capable of processing one or even a plurality of workpieces 26 by means of light paths 14 in a preferably independently controllable manner. Accordingly, in order to equally enable an accurate detection and evaluation of the protective glasses 10A & 10B introduced in such multi-scanner systems, likewise a plurality (in this case, two) of analysis devices D1 & D2 adapted to the number of protective glasses 10A & 10B are incorporated in the manufacturing facility 1, so that each of the implemented protective glasses 10A & 10B may preferably be individually analyzed and evaluated in order to improve a given manufacturing processes. In addition, for this purpose, the analysis devices D1 & D2 themselves are positioned in FIGS. 7A and 7B, analogously to the preceding embodiments, between one of the scan heads 2A & 2B and one of the shown protective glasses 10A & 10B respectively and comprise, similar to the embodiment shown in FIGS. 3A and 3B, a plurality of respective illumination devices L10-L17 as well as at least one sensor device S1 & S2 so as to precisely illuminate existing structures of contamination, deterioration and/or aging 28 occurring on the protective glasses 10A & 10B and to detect and analyze the latter by means of the detection mechanisms already mentioned above. Furthermore, in this case, the analysis devices D1 & D2 are equally respectively provided with a protective housing 7A & 7B formed at least laterally around the above-mentioned device elements and separating the interior space of the analysis device D1 & D2, leading to the effect that both, said incorporated device elements are again individually protected from potential process emissions (dust particles, smoke, etc.) and existing protective glass analysis conditions can be kept constant, e.g. by blocking certain background irradiations generated by the respective other analysis device D1 & D2.

Accordingly, it is evident from the illustrated embodiment that the present invention may be also optimally used in a manufacturing facility associated with a plurality of scanning heads 2A & 2B, protective glasses 10A & 10B or other devices required for workpiece production, in particular, by equally integrating at least a plurality of individually acting and independently positionable analysis devices D1 & D2. In this respect, the above-mentioned embodiment offers specifically the advantage that each protective glass 10A & 10B implemented in the manufacturing facility 1 may also be analyzed and further assessed by an analysis device D1 & D2 solely dedicated to this protective glass 10A & 10B, thus enabling an extremely precise detection of its condition.

Figures 8A, 8B:
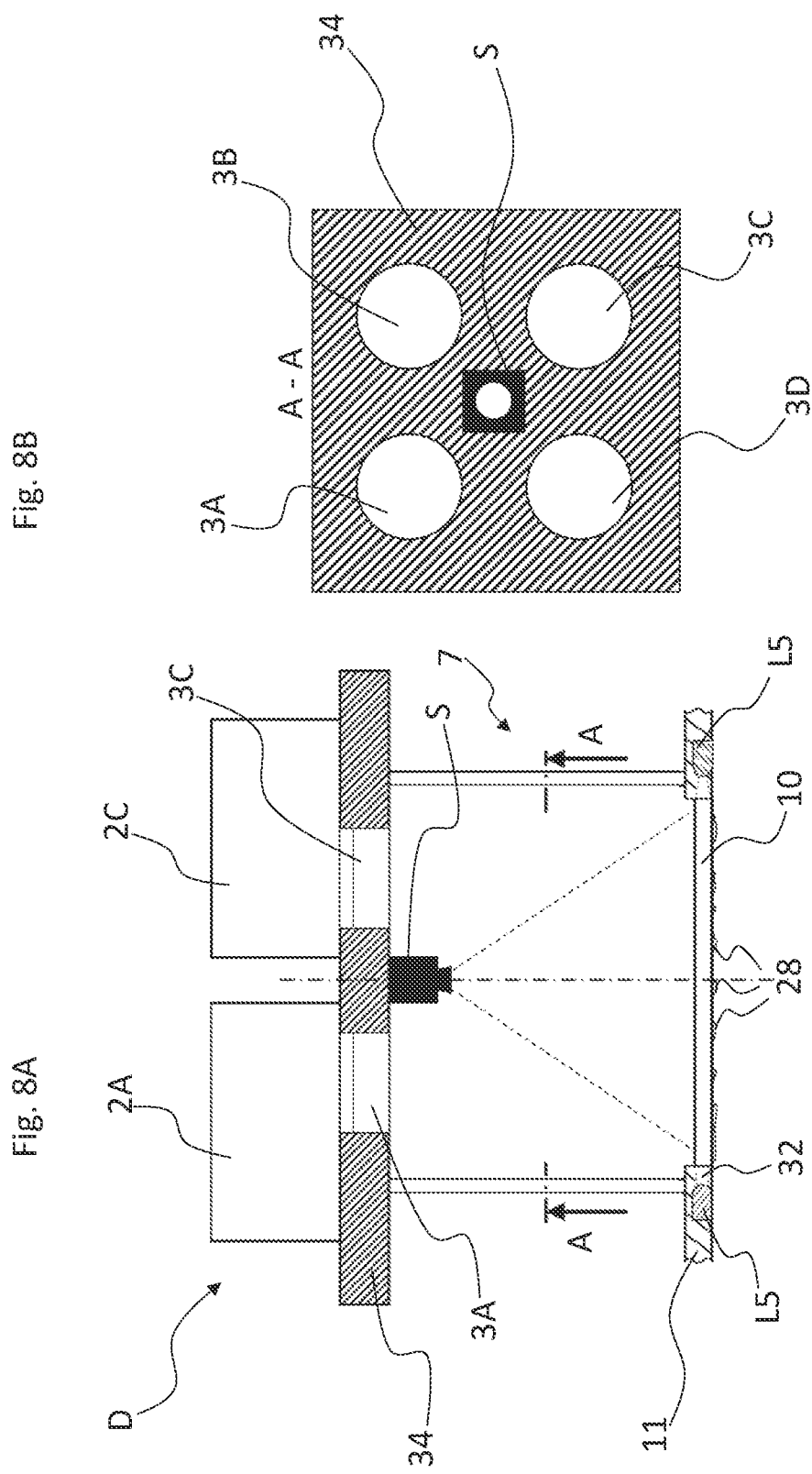
FIG. 8A shows a further embodiment of the analysis device, in which the sensor device is arranged coaxially to the protective glass.
FIG. 8B shows the embodiment of FIG. 8A as a detailed view in a horizontal cross-section.

Moreover, FIGS. 8A and 8B show an additional embodiment of the claimed analysis devices D, in which the manufacturing facility 1 is analogously provided with a plurality of scan heads 2A-2C as well as respective scan head glasses 3A-3C required for forwarding the light beam 14 emanating from the scan heads 2A-2C while, at the same time, the shown analysis device 1 comprises an illumination device L5 conforming to the embodiment of FIGS. 5A and 5B. In this case, the scan head glasses 3A-3C themselves are incorporated in an independent base plate 34 which is (at least thermally) decoupled from the analysis device D and/or the scan heads 2A-2C, enabling, in particular, the prevention of potential shifts/displacements of the scan heads 2A-2C and/or of the device elements of the analysis device D based on thermal expansions within the manufacturing facility 1 (which e.g. may occur during manufacturing of a given workpiece), so that a consistently more accurate and thus less error-prone machining or analysis process may be ensured.

Furthermore, FIG. 8B shows a schematic top view of the inner side of the base plate 34 described above depicted along the plane of view A. Herein, the respective scan head glasses 3A-3C are shown as circular installations incorporated in the scan heads 2A-2C (which may be, in further embodiments, likewise provided involving different geometries or even potential optical properties, e.g., wavelength-specific absorptions/reflections) and which are positioned at predefined distances, preferably for example concentrically arranged around a predefined central point, thus enabling processing of a given workpiece 26 by a plurality of simultaneously applicable light beams or paths. In addition, in this case, the sensor device S is mounted in the center of the concentrically arranged scan head glasses 3A-3C, which, due to its corresponding alignment equally centrally oriented to the protective glass 10, both generates a maximum detection area and, based on its implementation between the protective glass 10 and the scan heads 2A-2C shown again in FIG. 8A, may realize an extremely space-saving analysis set-up. In addition, this arrangement makes it possible to align the sensor device S in particular coaxially to the respective protective glass 10 (e.g. the longitudinal axis of the sensor device S may be parallel to at least one longitudinal axis of the protective glass 10), so that the image plane to be captured may already coincide with the protective glasses surface affected by the aforementioned deterioration, contamination and/or aging structures (in particular the inner side of the protective glass 10 present in the process chamber 12). Accordingly, the above-mentioned arrangement of the sensor device S and the illumination device L5 primarily generates an embodiment of the analysis device D which not only realizes an extremely space-saving positioning of the respective device elements, but also enables an optically preferred alignment of the corresponding optical sensor device S.

Figures 9A, 9B:
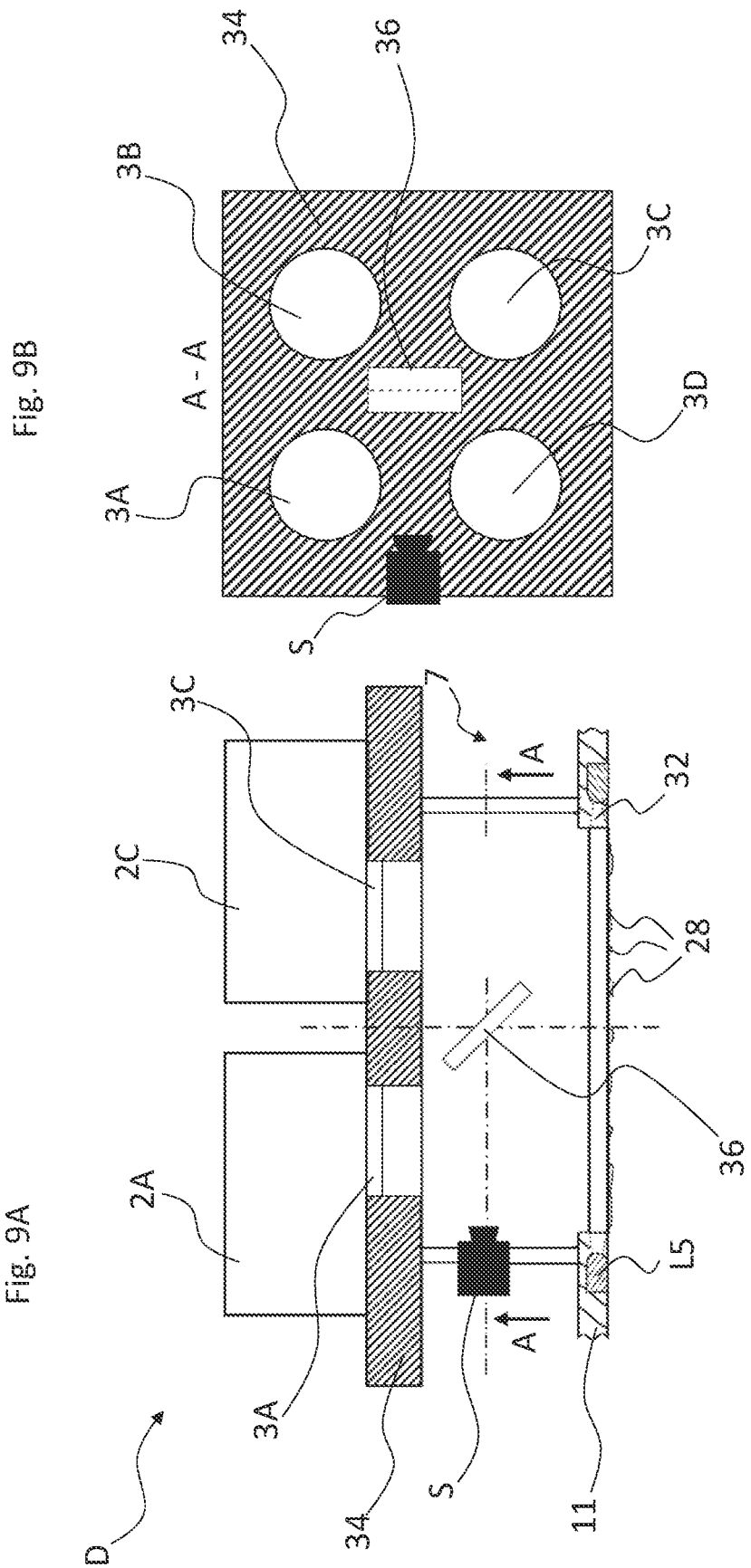
FIG. 9A shows a further embodiment of the analysis device, in which an additional mirror element is arranged in the analysis device for coaxial analysis of the protective glass.
FIG. 9B shows the embodiment of FIG. 9A as a detailed view in a horizontal cross-section.

Furthermore, as an alternative to the last described embodiment, the aforementioned coaxial alignment of the sensor device S may also be realized by additional optical elements, such as a fully or semi-transparent mirror. To this end, FIGS. 9A and 9B exemplarily show a further variant of the analysis device D, based on the embodiment of FIGS. 8A and 8B, in which the sensor device S, contrary to the aforementioned central positioning, is introduced laterally, for example in the structure of the protective housing 7, and may coaxially receive the scattered and reflected illumination emanating from the structures 28 of the protective glass 10 via an additional mirror device 36 mounted in the analysis device D. Herein, the advantage of this embodiment may be seen specifically in the fact that an extremely space-saving installation of the required device elements may be provided since the additional implementation of the mirror device 36 allows the sensor device S, (although still optically coaxially connected to the protective glass 10) to be potentially integrated at any desired position within the analysis device D. In addition, it may preferably also be possible to design the mirror device 36 in such a way that its orientation can be equally dynamically adapted to the current position or arrangement of a selected sensor device S, so that, with the aid of the first-mentioned device, not only the position of the corresponding sensor device S within the analysis device D can be freely varied, but also several sensor devices S may be integrated and utilized in a corresponding system.

The invention claimed is:

1. An analysis device for determining and/or monitoring a state of at least one protective glass of a manufacturing facility that is based on optical interaction, the protective glass being provided for protecting a light source configured for manufacturing a workpiece and/or optical elements of the manufacturing facility, the analysis device comprising:

at least one optical sensor device for detecting an object plane associated with the protective glass of the manufacturing facility that is based on optical interactions; and at least one evaluation unit for evaluating information obtained by detecting the object plane by means of the optical sensor device, wherein:

the analysis device is configured to be integrated into the manufacturing facility and to be positioned in the area of or along the light path of the light source, the optical sensor device is configured to be arranged in between the light source and the protective glass of the manufacturing facility and/or spaced from the protective glass on the side of the protective glass facing the light source, the evaluation unit is connected to a storage device for obtaining additional information, and the evaluation unit is configured, for determining a state of contamination, deterioration and/or aging of the protective glass, to take reference information from the storage device, to compare the information obtained by the optical sensor device with the reference information of the storage device and, depending on the differences of the compared information, determine a degree of deterioration, contamination or aging.

2. The analysis device according to claim 1, wherein the analysis device additionally comprises at least one illumination device for illuminating the object plane.

3. The analysis device according to claim 1, wherein the analysis device comprises a protective housing in which the optical sensor device and/or the illumination device are integrated; and the protective housing is configured to at least laterally enclose the optical sensor device and/or the illumination device.

4. The analysis device according to claim 1, wherein the optical sensor device comprises an imaging sensor element; and the imaging sensor element is configured to generate an at least one-dimensional image of the detected object plane of the protective glass.

5. The analysis device according to claim 1, wherein the information obtained by the optical sensor device comprises at least intensity values of an image captured by the optical sensor device;

the intensity values can be assigned to individual pixel positions of the captured image; and the evaluation unit is configured to identify deterioration, contamination and/or aging structures within the image based on the intensity values of the recorded image.

6. The analysis device according to claim 1, wherein the analysis device is configured to determine the state of deterioration, contamination and/or aging of the protective glass continuously or at predefined time intervals; and to at least partially use a measurement series of determined data relating to the state of deterioration, contamination and/or aging of the protective glass to determine a remaining lifetime of the protective glass.

7. A manufacturing system for manufacturing a workpiece by means of illuminating workpiece material and/or workpiece elements, comprising:

a manufacturing facility that is based on optical interaction, comprising at least one light source for processing the workpiece materials and/or workpiece elements, at least one light path generated by the light source and one or more protective glasses for protecting at least the light source from deterioration and/or contamination; and the analysis device according to claim 1, wherein the analysis device is integrated into the manufacturing facility.

8. The manufacturing system according to claim 7, wherein the optical interaction-based manufacturing facility additionally comprises a process chamber in which the workpiece is manufactured by illumination using the light source; wherein the at least one protective glass is integrated into a housing of the process chamber, and the analysis device is configured in such a way that the light source directs the generated light path through the analysis device into the process chamber.

9. The manufacturing system according to claim 8, wherein an illumination device of the analysis device is integrated into the housing of the process chamber in such a way that the protective glass of the manufacturing facility is laterally illuminated by the illumination device, and wherein the manufacturing system is an SLM system.

10. The manufacturing system according to claim 7, wherein the analysis device is configured to determine the state of contamination, deterioration and/or aging of the protective glass after predefined manufacturing processes or process steps of the manufacturing facility, and/or wherein the analysis device is configured to monitor the state of the protective glass during a manufacturing process of the manufacturing facility.

11. The manufacturing system according to claim 7, wherein the manufacturing facility additionally comprises at least one shutter or sliding element for shielding the analysis device from illuminations emanating from the manufacturing facility; wherein the shutter or sliding element is configured to be at least movable from a first position for shielding the analysis device to a second position for illuminating the analysis device at least from the sides of the process chamber and back.

12. A method for determining a state of at least one protective glass of a manufacturing facility that is based on optical interactions comprising at least one light source configured to manufacture a workpiece and a light path generated by the light source, wherein the method is conducted by an analysis device according to claim 1 and comprising:

detecting an object plane associated with the at least one protective glass of the manufacturing facility by an optical sensor device;

illuminating the object plane by an illumination device;

evaluating the information obtained by the detection of the object plane of the protective glass by an evaluation unit, the evaluation of the information comprising at least the step of analyzing detected light intensity values.

13. The method according to claim 12 further comprising:

detecting the state of the protective glass by the analysis device in between manufacturing processes of the manufacturing facility;

determining a degree of deterioration, contamination or aging of the protective glass by comparing the information obtained through detection of the object plane by the optical sensor device with predefined reference information;

monitoring the condition of the at least one protective glass and/or determining the service life of the protective glass on the basis of a plurality of information regarding the state of deterioration, contamination and/or aging of the protective glass determined by the analyzing device.

* * * * *